US012678360B2

(12) United States Patent
Kaforey et al.

(10) Patent No.: US 12,678,360 B2
(45) Date of Patent: Jul. 14, 2026

(54) PATIENT SUPPORT DEVICE FOR POSITIONING DURING A SURGICAL PROCEDURE AND LATERAL PATIENT TRANSFER

(71) Applicant: Xodus Medical, Inc., New Kensington, PA (US)

(72) Inventors: Craig Kaforey, Allison Park, PA (US); Mark Kaforey, Murrysville, PA (US)

(73) Assignee: Xodus Medical, Inc., New Kensington, PA (US)

( * ) Notice: Subject to any disclaimer, the term of this patent is extended or adjusted under 35 U.S.C. 154(b) by 371 days.

(21) Appl. No.: 18/505,597

(22) Filed: Nov. 9, 2023

(65) Prior Publication Data

US 2024/0156662 A1 May 16, 2024

Related U.S. Application Data

(60) Provisional application No. 63/488,595, filed on Mar. 6, 2023, provisional application No. 63/424,594, filed (Continued)

(51) Int. Cl.
*A61G 13/12* (2006.01)

(52) U.S. Cl.
CPC ..... *A61G 13/1265* (2013.01); *A61G 13/1205* (2013.01)

(58) Field of Classification Search
CPC .. A61G 7/001; A61G 7/05769; A61G 7/1021; A61G 7/05776; A61G 7/1028; A61G 2200/32; A61G 7/1026; A61G 13/1265; A61G 13/1205; A61G 7/07; A61G 13/122; A61G 13/1225; A61G 13/123; A61G 13/1245; A47C 27/081; A47C 27/10; A47C 20/048; A47C 20/027; A47C 27/08; A61B 2090/08021; A61B 34/30; A61B 46/00; A61B 6/0485; A61F 5/30; A61F 5/3769; A61F 2007/006; A61F 5/3776

(Continued)

(56) References Cited

U.S. PATENT DOCUMENTS

| | | |
|---|---|---|
| 4,272,856 A | 6/1981 | Wegener et al. |
| 8,464,720 B1 | 6/2013 | Pigazzi et al. |

(Continued)

FOREIGN PATENT DOCUMENTS

| | | | |
|---|---|---|---|
| WO | WO-2010106103 A1 * | 9/2010 | ............... A47C 4/54 |
| WO | WO-2021087155 A2 * | 5/2021 | ........... A61G 13/126 |
| WO | 2021191745 A1 | 9/2021 | |

*Primary Examiner* — Madison Matthews
(74) *Attorney, Agent, or Firm* — The Webb Law Firm

(57) ABSTRACT

A patient support device for positioning a patient on an operating table during a surgical procedure and for lateral patient transfer includes a viscoelastic foam body having a substantially flat first surface configured to be in contact with the patient, an opposing substantially flat second surface, and a peripheral edge extending therebetween. The patient support device also includes an inflatable enclosure connected to the second surface of the body that defines an inflatable cavity configured to receive a pressurized gas. The enclosure includes a plurality of perforations extending through a portion of the enclosure positioned to allow the pressurized gas to pass from the cavity through the plurality of perforations toward the operating table.

19 Claims, 17 Drawing Sheets

Related U.S. Application Data on Nov. 11, 2022, provisional application No. 63/424,265, filed on Nov. 10, 2022.

(58) Field of Classification Search
USPC ......... 5/713, 715, 706, 710, 81.1 R; 128/845
See application file for complete search history.

(56) References Cited

U.S. PATENT DOCUMENTS

| | | | | |
|---|---|---|---|---|
| 9,161,876 | B2 | 10/2015 | Pigazzi et al. | |
| 9,782,287 | B2 | 10/2017 | Pigazzi et al. | |
| 10,688,004 | B2 | 6/2020 | Holladay | |
| 10,842,574 | B2 | 11/2020 | Kaforey | |
| 10,912,699 | B2 * | 2/2021 | Pigazzi | A61G 13/123 |
| 11,266,525 | B2 | 3/2022 | Kaforey et al. | |
| 11,364,166 | B2 | 6/2022 | Grindstaff et al. | |
| 11,382,816 | B2 | 7/2022 | Shandas et al. | |
| 11,484,456 | B2 | 11/2022 | Pigazzi et al. | |
| 11,510,805 | B2 | 11/2022 | Kaiser et al. | |
| 11,559,455 | B2 | 1/2023 | Smith et al. | |
| 11,564,855 | B2 | 1/2023 | Kaiser et al. | |
| 11,642,267 | B2 | 5/2023 | Kea et al. | |
| 11,684,532 | B2 | 6/2023 | Kaiser et al. | |
| 11,691,350 | B2 | 7/2023 | Augustine et al. | |
| 11,701,281 | B2 | 7/2023 | Meah | |
| 11,801,188 | B2 | 10/2023 | Augustine | |
| 11,844,733 | B1 | 12/2023 | Augustine et al. | |
| 11,896,326 | B2 | 2/2024 | Itkowitz et al. | |
| 11,957,628 | B2 | 4/2024 | Kovacs | |
| 2002/0112287 | A1 | 8/2002 | Thomas et al. | |
| 2012/0311781 | A1 * | 12/2012 | Purdy | A61G 7/05792 5/81.1 T |
| 2016/0228281 | A1 | 8/2016 | Marshall et al. | |
| 2017/0216117 | A1 * | 8/2017 | Rigoni | A61G 1/01 |
| 2018/0200130 | A1 * | 7/2018 | Liu | A61G 7/1021 |
| 2018/0200132 | A1 | 7/2018 | Holladay | |
| 2018/0353360 | A1 * | 12/2018 | Kea | A61G 7/065 |
| 2019/0365553 | A1 | 12/2019 | Drivere | |
| 2020/0179203 | A1 | 6/2020 | Rigoni et al. | |
| 2021/0186780 | A1 * | 6/2021 | Davis | A61G 1/048 |
| 2022/0233379 | A1 | 7/2022 | Kurt et al. | |

* cited by examiner

PATIENT SUPPORT DEVICE FOR POSITIONING DURING A SURGICAL PROCEDURE AND LATERAL PATIENT TRANSFER

CROSS REFERENCE TO RELATED APPLICATIONS

This application claims the benefit of U.S. Provisional Patent Application No. 63/424,265, filed Nov. 10, 2022, U.S. Provisional Patent Application No. 63/424,594, filed Nov. 11, 2022, and U.S. Provisional Patent Application No. 63/488,595, filed Mar. 6, 2023, the disclosure of each of which is hereby incorporated by reference in its entirety.

BACKGROUND

Field of the Invention

The invention relates generally to pads, cushions, pillows, and supports for cushioning and positioning a patient's body and, specifically, to a viscoelastic foam pad configured to support a patient during a surgical procedure and that provides assistance for lateral patient transport.

Description of Related Art

Patient positioning devices, such as mats, pads, mattresses, cushions, and pillows, of various designs are used for holding a patient in a desired position during a surgical procedure. For example, elongated foam pads, such as pads formed from egg-crate foam, can be placed between a patient's torso and an operating table for comfort. Also, foam pillows of various shapes can be used to hold arms, shoulders, legs, and other body parts in desired positions during a surgical procedure. In some cases, the patient positioning devices can include integral straps, cables, or ties for securing the devices in place on the operating table at desired positions. In other examples, medical tape, twist ties, or temporary adhesives can be used for tying or otherwise securing the positioning devices in place.

Patient transport assist devices and systems, such as inflatable bladders, positive pressure movement devices, and similar systems are also known in the art. These devices and systems can be used for moving patients, including obese patients and/or patients with high body mass index (BMI) values. Such transport assist devices and systems can be particularly important in medical facilities that have developed "no-lift" policies as a way to reduce work place injuries. In such facilities, nurses and other caregivers may only be allowed to move or reposition a patient with the help of a transport assist device or system.

However, there is a need for integrated devices, assemblies, and systems that contribute to both patient positioning and transport. The patient positioning devices, systems, and methods disclosed herein are configured to address these issues.

SUMMARY

According to an aspect of the disclosure, a patient support device for positioning a patient on an operating table during a surgical procedure and for lateral patient transfer includes a viscoelastic foam body having a substantially flat first surface configured to be in contact with the patient, an opposing substantially flat second surface, and a peripheral edge extending therebetween. The device also includes an inflatable enclosure connected to the second surface of the body that defines an inflatable cavity configured to receive a pressurized gas. The enclosure includes a plurality of perforations extending through a portion of the enclosure positioned to allow the pressurized gas to pass from the cavity through the perforations toward the operating table. The device also includes at least one lower pad with viscoelastic foam connected to the inflatable enclosure. The at least one lower pad includes an outwardly facing surface configured to contact the operating table for holding the patient support device in place against the operating table.

According to another aspect of the disclosure, a system for patient support and lateral transport includes the patient support device, as previously described, which includes an inlet tube in fluid communication with the cavity of the enclosure. The system also includes a blower connected to the inlet tube for providing pressurized gas to the inflatable cavity of the enclosure through the inlet tube.

According to another aspect of the present disclosure, a patient support device for positioning a patient on an operating table during a surgical procedure and for lateral patient transfer includes a viscoelastic foam body having a substantially flat first surface configured to be in contact with the patient, an opposing substantially flat second surface, and a peripheral edge extending therebetween. The positioning device also includes an inflatable enclosure connected to the second surface of the body that defines an inflatable cavity configured to receive a pressurized gas. The enclosure includes a plurality of perforations extending through a portion of the enclosure positioned to allow the pressurized gas to pass from the cavity through the perforations toward the operating table.

Non-limiting illustrative examples of embodiments of the present disclosure will now be described in the following numbered clauses.

Clause 1: A patient support device for positioning a patient on an operating table during a surgical procedure and for lateral patient transfer, the support device comprising: a viscoelastic foam body comprising a substantially flat first surface configured to be in contact with the patient, an opposing substantially flat second surface, and a peripheral edge extending therebetween; an inflatable enclosure connected to the second surface of the body that defines an inflatable cavity configured to receive a pressurized gas, wherein the enclosure comprises a plurality of perforations extending through a portion of the enclosure positioned to allow the pressurized gas to pass from the cavity through the perforations toward the operating table; and at least one lower pad comprising viscoelastic foam connected to the inflatable enclosure, the at least one lower pad comprising an outwardly facing surface configured to contact the operating table for holding the patient support device in place against the operating table.

Clause 2: The patient support device of clause 1, wherein the pressurized gas passing through the perforations reduces friction between the patient support device and a surface of the operating table, thereby allowing the patient support device to slide more easily over the surface of the operating table than when the pressurized gas is not provided to the inflatable cavity.

Clause 3: The patient support device of clause 1 or clause 2, further comprising at least one strap for carrying the patient support device connected to the body and/or enclosure of the support device.

Clause 4: The patient support device of any of clauses 1-3, further comprising a plurality of loop straps, each loop strap having opposing ends connected to the body and/or enclosure to form loops for carrying the patient support device.

Clause 5: The patient support device of clause 4, further comprising at least one extended strap comprising a first end portion, a second end portion, and an intermediate portion therebetween, and wherein the intermediate portion of the at least one extended strap is attached to the enclosure while the end portions of the at least one extended strap are not connected to the enclosure.

Clause 6: The patient support device of clause 5, wherein the intermediate portion of the at least one extended strap is connected to the enclosure by an adhesive and/or are sewn to the enclosure.

Clause 7: The patient support device of any of clauses 1-6, wherein the body has a length sufficient to extend from at least thighs of the patient to at least shoulders of the patient to support a torso of the patient placed on the body.

Clause 8: The patient support device of any of clauses 1-7, wherein the body and the at least one lower pad comprise the viscoelastic foam comprising at least one of a polyurethane foam (e.g., a foam made by mixing polyhydroxy polyol with toluene di-isocyanate, polyester polyols, and/or polyether).

Clause 9: The patient support device of any of clauses 1-8, wherein the viscoelastic foam has a coefficient of friction of from about 0.2 to about 2.5 and a glass transition temperature of between about −5° C. and about 5° C.

Clause 10: The patient support device of any of clauses 1-9, wherein the viscoelastic foam has a density of about 2 pcf to about 8 pcf (about 35 kilograms per cubic meter to about 128 kilograms per cubic meter).

Clause 11: The patient support device of any of clauses 1-10, wherein the body and the at least one lower pad are formed from a same type of viscoelastic foam material.

Clause 12: The patient support device of any of clauses 1-11, wherein the body and the at least one lower pad are formed from different types of viscoelastic foam material.

Clause 13: The patient support device of clause 12, wherein the viscoelastic foam material of the body is more absorbent (e.g., moisture wicking) than the viscoelastic foam material of the at least one lower pad.

Clause 14: The patient support device of clause 13, wherein a material of the body is less dense than is a material of the at least one lower pad.

Clause 15: The patient support device of any of clauses 1-14, wherein the body comprises an elongated pad having a length that is greater than its width, and wherein the body is from about 0.5 inch to 3.0 inches or, preferably about 1.5 inches thick.

Clause 16: The patient support device of clause 15, wherein an area of the first surface or the second surface of the body is less than an area of a first surface or a second surface of the enclosure.

Clause 17: The patient support device of clause 16, wherein the body is substantially rectangular having a length of about 25 inches to 80 inches and a width of about 10 inches to 40 inches.

Clause 18: The patient support device of any of clauses 1-17, wherein the inflatable enclosure comprises a first sheet connected to the second surface of the body and a second sheet connected to the first sheet defining the inflatable cavity, and wherein the plurality of perforations extend through the second sheet.

Clause 19: The patient support device of clause 18, wherein the first sheet and/or the second sheet comprise a synthetic polymer comprising nylon, polyethylene, or polypropylene.

Clause 20: The patient support device of any of clauses 1-19, wherein the plurality of perforations are provided on a center longitudinal strip extending over a lower surface of the enclosure and at least one separate additional longitudinal strip extending over the lower surface of the enclosure, wherein a width of the center longitudinal strip is greater than a width of the at least one additional longitudinal strip that is narrower than the central strip.

Clause 21: The patient support device of any of clauses 1-20, wherein the plurality of perforations are provided as a first longitudinal strip, a second longitudinal strip separate from the first strip that passes along a central longitudinal axis of the enclosure, and a third longitudinal strip that is separate from the first strip and the second strip.

Clause 22: The patient support device of any of clauses 1-21, further comprising at least one inlet tube in fluid communication with the inflatable cavity for providing the pressurized gas to the inflatable cavity.

Clause 23: The patient support device of any of clauses 1-22, wherein the at least one lower pad comprises a thoracic pad positioned to be proximate to a thoracic region (e.g., upper back and/or shoulders) of the patient and a caudal pad positioned to be proximate to a caudal region (e.g., tailbone or buttocks) of the patient.

Clause 24: The patient support device of clause 23, wherein the thoracic pad and/or the caudal pad is an elongated shape having a longitudinal axis that is substantially transverse to a longitudinal axis of the body and the enclosure.

Clause 25: The patient support device of clause 23 or clause 24, wherein the caudal pad is a trapezoid shape having a long side positioned proximate to the thoracic pad and a short side proximate to the peripheral edge of the body.

Clause 26: The patient support device of any of clauses 1-25, wherein the at least one lower pad is about 0.25 inch to about 1.0 inch thick.

Clause 27: The patient support device of any of clauses 1-26, wherein the at least one lower pad is thinner than the body.

Clause 28: The patient support device of any of clauses 1-27, wherein the surgical procedure is a procedure performed with the patient in a Trendelenburg or the reverse Trendelenburg position.

Clause 29: A system for patient support and lateral transport, comprising: the patient support device of any of clauses 1-28, further comprising an inlet tube in fluid communication with the cavity of the enclosure; and a blower connected to the inlet tube for providing the pressurized gas to the inflatable cavity of the enclosure through the inlet tube.

Clause 30: A patient support device for positioning a patient on an operating table during a surgical procedure and for lateral patient transfer, the support device comprising: a viscoelastic foam body comprising a substantially flat first surface configured to be in contact with the patient, an opposing substantially flat second surface, and a peripheral edge extending therebetween; and an inflatable enclosure connected to the second surface of the body that defines an inflatable cavity configured to receive a pressurized gas, wherein the enclosure comprises a plurality of perforations extending through a portion of the enclosure positioned to allow the pressurized gas to pass from the cavity through the perforations toward the operating table.

Clause 31: The patient support device of clause 30, wherein the pressurized gas passing through the perforations reduces friction between the patient support device and a surface of the operating table, thereby allowing the patient support device to slide more easily over the surface of the operating table than when the pressurized gas is not provided to the inflatable cavity.

Clause 32: The patient support device of clause 30 or clause 31, wherein the inflatable enclosure comprises a first sheet connected to the second surface of the body and a second sheet connected to the first sheet defining the inflatable cavity, and wherein the plurality of perforations extend through the second sheet.

Clause 33: The patient support device of clause 32, wherein the second sheet comprises an outwardly facing surface configured to contact the operating table.

Clause 34: The patient support device of clause 32 or clause 33, wherein the first sheet and/or the second sheet comprise a synthetic polymer comprising nylon, polyethylene, or polypropylene.

Clause 35: The patient support device of any of clauses 30-34, wherein the plurality of perforations are provided on a center longitudinal strip extending over a lower surface of the enclosure and at least one separate additional longitudinal strip extending over the lower surface of the enclosure, wherein a width of the center longitudinal strip is greater than a width of the at least one additional longitudinal strip that is narrower than the central strip.

Clause 36: The patient support device of any of clauses 30-35, wherein the plurality of perforations are provided as a first longitudinal strip, a second longitudinal strip separate from the first strip that passes along a central longitudinal axis of the enclosure, and a third longitudinal strip that is separate from the first strip and the second strip.

Clause 37: The patient support device of any of clauses 30-36, further comprising at least one inlet tube in fluid communication with the inflatable cavity for providing the pressurized gas to the inflatable cavity.

Clause 38: The patient support device of any of clauses 30-37, wherein the surgical procedure is a procedure performed with the patient in a Trendelenburg or the reverse Trendelenburg position.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limit of the invention.

DETAILED DESCRIPTION

Figure 1A:
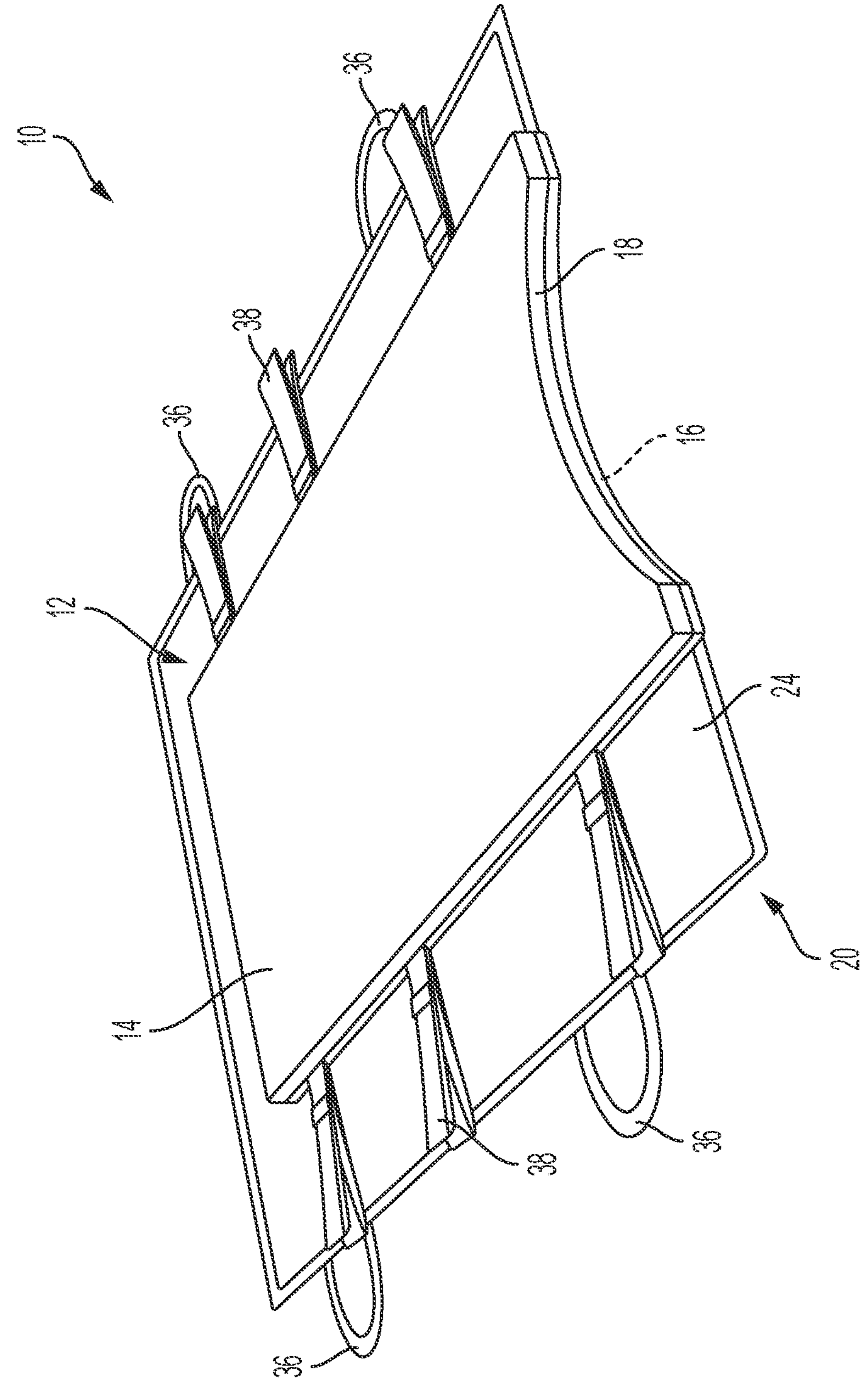
FIG. 1A is a perspective view of a patient support device in a deflated state, according to an aspect of the disclosure.
Figure 1B:
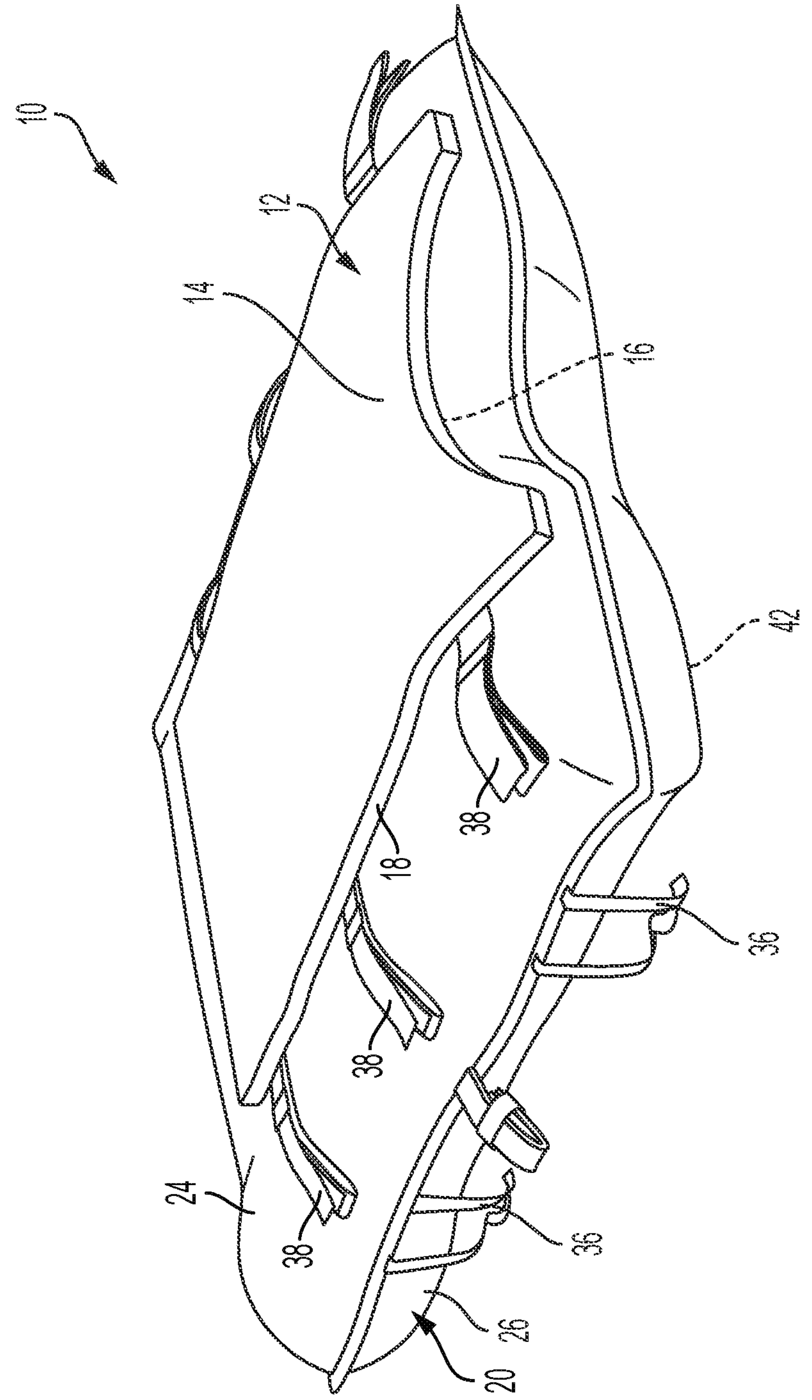
FIG. 1B is another perspective view of the patient support device of FIG. 1A, in an inflated state, according to an aspect of the disclosure.
Figure 1C:
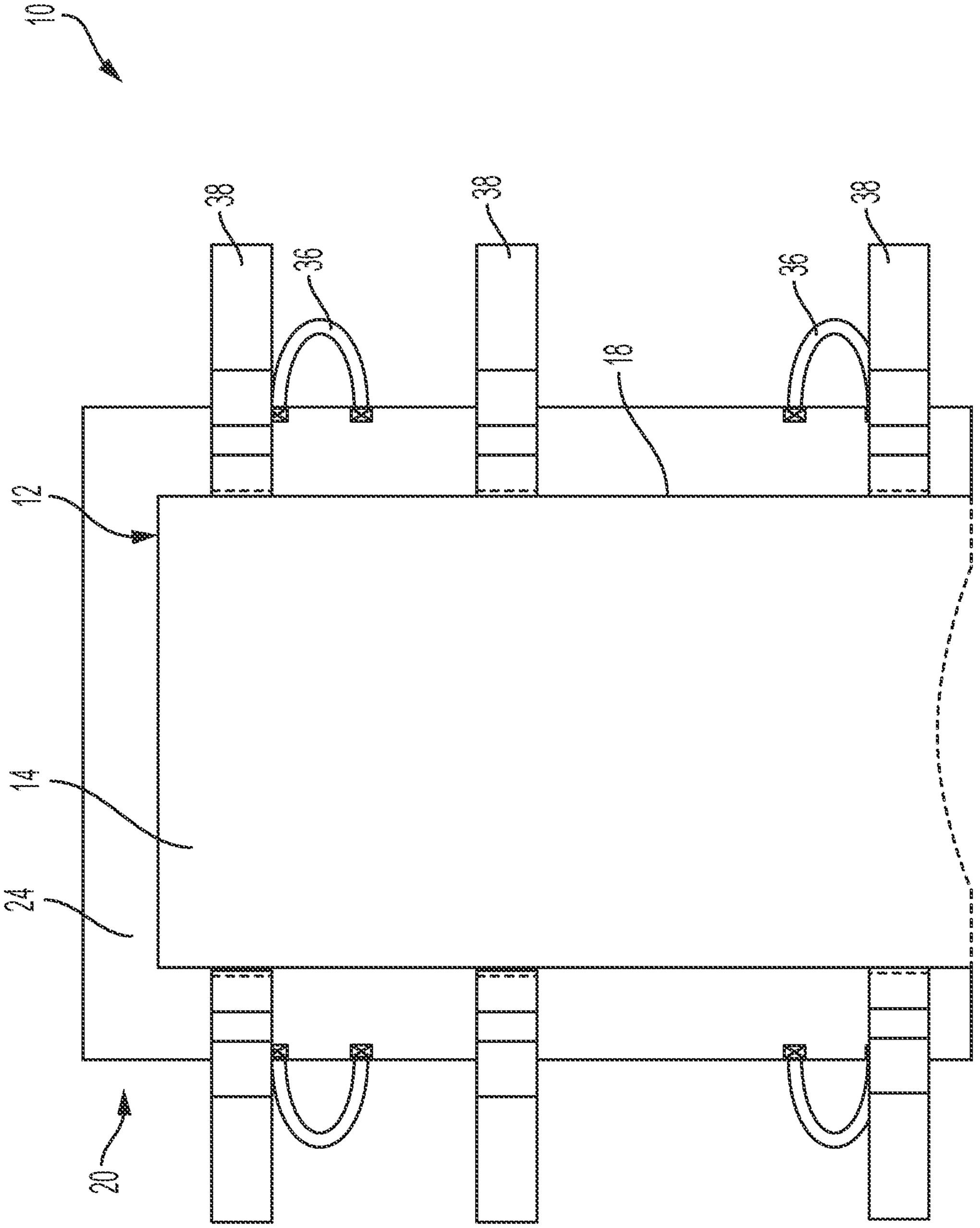
FIG. 1C is a top view of the patient support device of FIG. 1A.

As used herein, the singular form of “a”, “an”, and “the” include plural referents unless the context clearly dictates otherwise. For the purposes of this specification, unless otherwise indicated, all numbers expressing quantities of ingredients, reaction conditions, dimensions, physical characteristics, and so forth used in the specification and claims are to be understood as being modified in all instances by the term “about.”

As used herein, the terms “right”, “left”, “top”, and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples.

Hence, specific dimensions and other physical characteristics related to the embodiments disclosed herein are not to be considered as limiting.

Patient Support Device and System

FIGS. 1A-2B show a patient support device 10 for positioning a patient on an operating table during a surgical procedure and for lateral patient transfer. For example, the patient support device 10 can be configured to support the patient during surgical procedures including, for example, gynecological procedures, colorectal procedures, urological procedures, laparoscopic procedures, or robotic procedures. In some examples, the patient support device 10 can be used to support a patient in the Trendelenburg or the reverse Trendelenburg position with the operating table positioned at an angle of from about 10 degrees to about 45 degrees, or preferably from about 15 degrees to about 30 degrees.

The patient support device 10 is configured to transition between a deflated state (shown in FIG. 1A) and an inflated state (shown in FIG. 1B) in order to facilitate lateral patient transfer. In particular, the patient support device 10 can be inflated and used for assisting caregivers in moving and repositioning obese patients and patients with a high BMI. The patient support device 10 can also be used for lateral patient transfer in medical facilities that have adopted no-lift policies.

As used herein, a "lateral patient transfer" can refer to efforts to move the patient laterally, such as from the operating table to another bed, gurney, stretcher, or another piece of furniture that is about a same height as the operating table. More specifically, as described herein, the patient support device 10 includes an air assist or positive pressure system, where pressurized gas, such as pressurized gas or air provided by a blower 52 (shown in FIG. 2C) (e.g., a Shop-Vac® vacuum, other vacuum pump, or positive pressure displacement device) is used to reduce friction between the patient support device 10 and the operating table so that the patient support device 10 can more easily slide laterally from the operating table to the bed, gurney, stretcher, or similar support. In other examples, pressurized gas can be provided from a sealed canister or container containing a sufficient volume of pressurized gas (e.g., nitrogen, oxygen, or air) to inflate the patient support device 10.

As shown in FIGS. 1A-2B, the patient support device 10 comprises a foam body 12, such as a viscoelastic foam body, comprising a substantially flat first or upper surface 14 configured to be in contact with the patient, an opposing substantially flat second or lower surface 16, and a peripheral edge 18 extending therebetween. In some examples, the body 12 can comprise a foam (e.g., an open or closed cell foam) pad with a length sufficient to extend from at least thighs of the patient to at least shoulders of the patient to support a torso of the patient. For example, the body 12 can be about 25 inches to about 80 inches long, about 10 inches to 40 inches wide, and about 0.5 inch to about 3.0 inches thick, or about 1.5 inches thick. Alternatively, in some examples, the body 12 can be a full length pad (e.g., about 60 inches to about 80 inches in length), which extends a full length of the operating table and/or is long enough to support the patient's entire body.

The patient support device 10 further comprises an inflatable lifting member or enclosure 20 connected to the lower surface 16 of the body 12, which defines an inflatable cavity configured to receive a pressurized gas. The enclosure 20 can further comprise perforations 22 (shown in FIGS. 1D and 2B), such as holes, openings, slots, slits, or any other space or gap, extending through a portion of the enclosure 20 positioned to allow the pressurized gas to pass from the cavity through the perforations 22 towards the operating table. In particular, the pressurized gas passing through the perforations 22 can apply sufficient force to the operating table to reduce friction between the patient support device 10 and the surface of the operating table, which allows the patient support device 10 to slide more easily over the surface of the operating table than when the pressurized gas is not provided to the inflatable cavity of the enclosure 20. As such, the inflatable enclosure 20 provides a hovercraft or air hockey effect for facilitating lateral patient transport.

With continued reference to FIGS. 1A-2B, in some examples, the inflatable enclosure 20 comprises a first or upper sheet 24 connected to the lower surface 16 of the body 12 and a second or lower sheet 26 attached to the upper sheet 24. The sheets 24, 26 can be formed from various substantially airtight materials, as are known in the art, such as fabrics comprising nylon, polyethylene, polypropylene, polyester, and other synthetic polymer materials. Peripheral portions of the sheets 24, 26 can be connected together by sewing, adhesives, lamination, or other connections for forming the inflatable cavity configured to receive the pressurized gas.

Figure 1D:
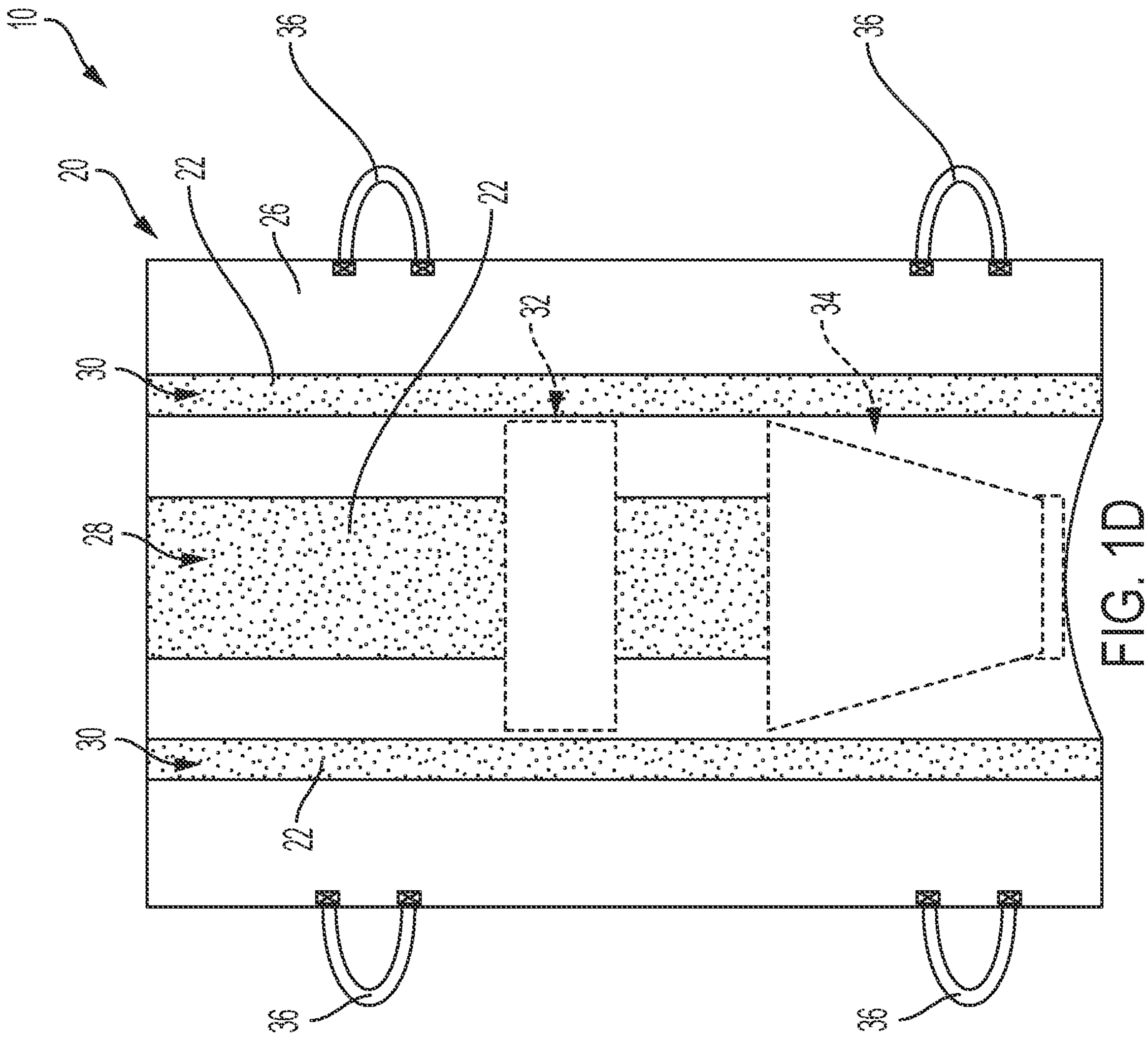
FIG. 1D is a bottom view of the patient support device of FIG. 1A.
Figure 2A:
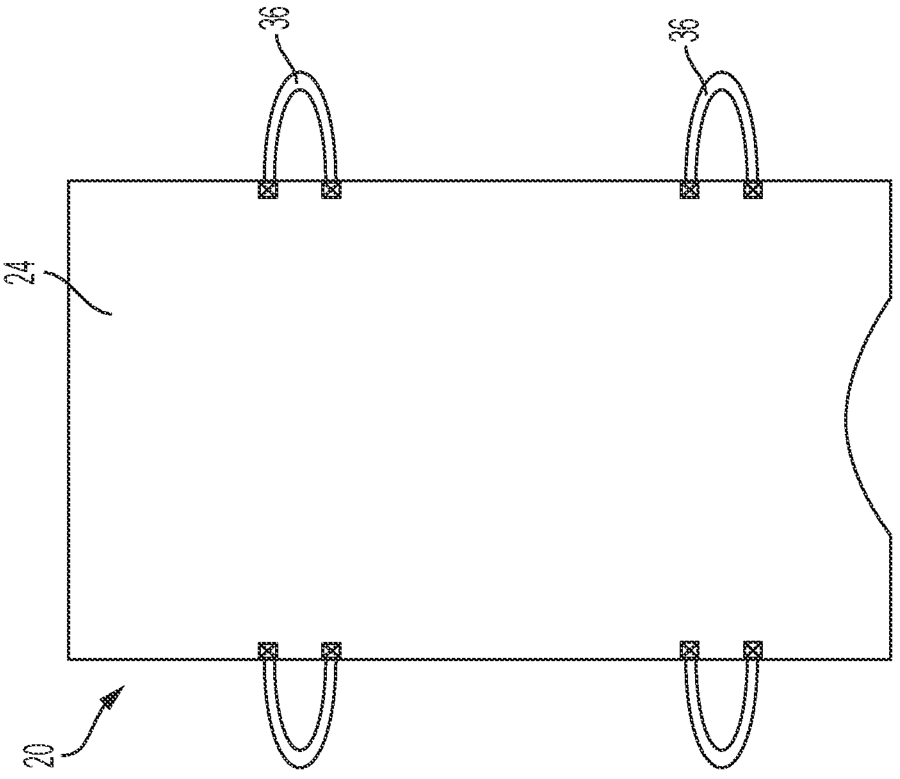
FIG. 2A is a top view of an inflatable enclosure of a patient support device, according to an aspect of the disclosure.
Figure 2B:
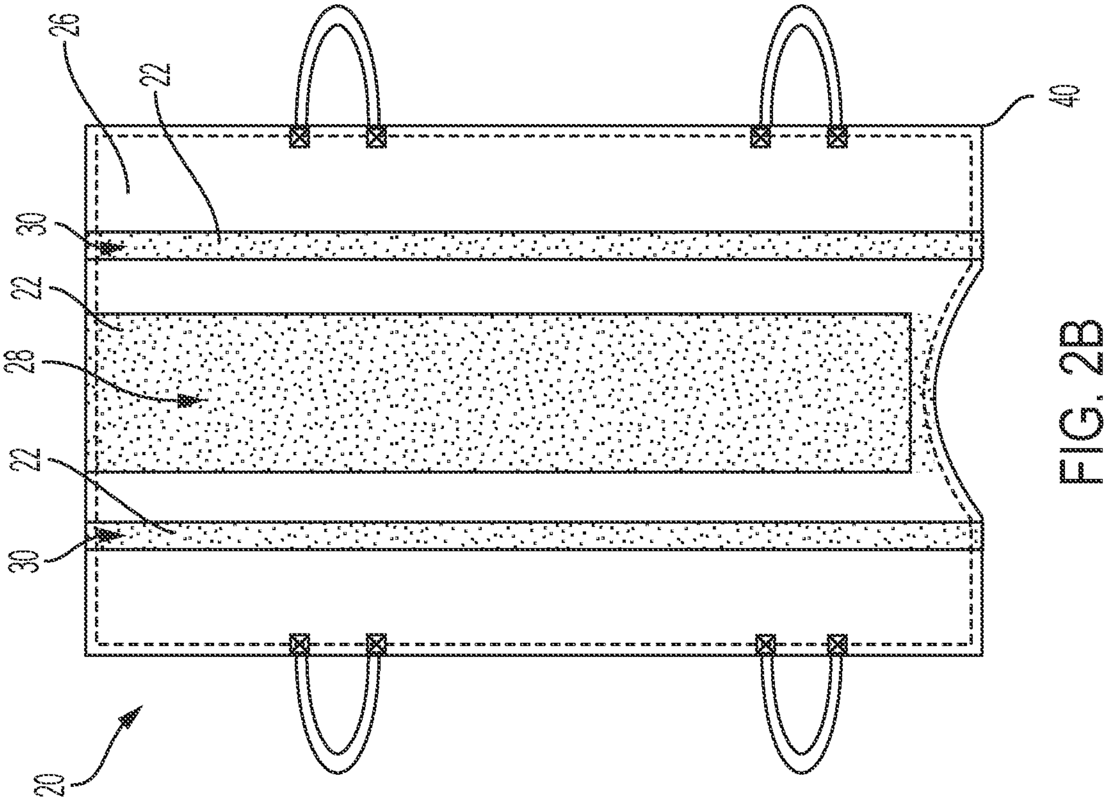
FIG. 2B is a bottom view of the inflatable enclosure of FIG. 2A.

As shown in the figures, the perforations 22 extend through the lower sheet 26. The perforations 22 can be provided on a bottom or lower surface of the inflatable enclosure 20 in a variety of configurations and arrangements to facilitate movement of the patient support device 10 and patient. For example, as shown in FIGS. 1D and 2B, some of the perforations 22 are provided in a center longitudinal strip 28 extending over a lower surface of the enclosure 20. Other perforations 22 are provided on separate additional longitudinal strips 30 extending over the lower surface of the enclosure 20. In some examples, the center longitudinal strip 28 can be wider than either of the additional longitudinal strips 30. For example, the central longitudinal strip 28 can be about 8 inches to about 10 inches or about 9 inches wide. By contrast, the additional longitudinal strips 30 can be about 1 inch to 3 inches or about 1.5 inches wide. The additional longitudinal strips 30 can be spaced apart from the central longitudinal strip 28 by a gap of about 2 inches to 5 inches or about 4 inches.

The patient support device 10 further includes one or more lower or base pads 32, 34 formed from foam, such as a viscoelastic foam, connected to the inflatable enclosure 20. For example, the lower or base pads 32, 34 can be connected to the lower sheet 26 by a suitable adhesive, staples, or other conventional connectors. The lower pads 32, 34 are configured to contact a surface of the operating table, for holding the patient support device 10 against the operating table. In particular, the lower pads 32, 34 can comprise an outwardly facing surface configured to contact the operating table, when the enclosure 20 is partially or fully deflated, thereby holding the patient support device 10 in place against the operating table. As such, the lower pads 32, 34 can be formed from a tacky material (e.g., a material with a high coefficient of friction) that resists sliding over the surface of the operating table. As shown in the figures, the lower pad(s) 32, 34 do not cover an entire surface of the bottom sheet 26 of the inflatable entire enclosure 20. Instead, a total area and/or volume of the lower pad(s) 32, 34 can be substantially less (e.g., 50%, 25% or 10% less) than a total area and/or volume of the viscoelastic foam body 12. In some examples, the lower pads 32, 34 are positioned at portions of the patient support device 10 that are expected to receive a substantial portion of the patient's weight and/or are expected to be compressed against the operating table due to the patient's weight.

As shown in FIG. 1D, in some examples, one of the lower pads 32, 34 is a thoracic pad 32 positioned to be proximate to a thoracic, upper back, and/or shoulder region of the patient, when the patient is resting on the foam body 12 of the patient support device 10. The patient support device 10 also includes a caudal pad 34 positioned to be proximate to a caudal region (e.g., tailbone or buttocks) of the patient. The thoracic pad 32 can be an elongated shape, such as a rectangle or oval, having a longitudinal axis that is substantially transverse to a longitudinal axis of the body 12 and the enclosure 20. The caudal pad 34 can also be an elongated shape, such as a rectangle or oval, as well as any other convenient shape, such as a circle, square, polygon, diamond, or parallelogram. In other examples, the caudal pad 34 can be a trapezoid shape having a long side positioned proximate to the thoracic pad 32 and a short side proximate to the peripheral edge 18 of the body 12. In some examples, the lower pad(s) 32, 34 can be formed from similar materials as the body 12, such as materials having a same composition, density, or porosity. However, the lower pad(s) 32, 34 can be thinner than the body 12. For example, the lower pad(s) 32, 34 can be about 0.25 inch to about 1.0 inch thick. By contrast, the body 12 can be from 0.5 inch thick to 1.5 inches thick to provide additional comfort for the patient resting on the foam body 12.

The patient support device 10 can further comprise straps 36, 38 for manipulating, moving, shifting, adjusting, and/or carrying the patient support device 10. For example, the patient support device 10 can include short or loop straps 36. The loop straps 36 include ends connected to the body 12 and/or to surfaces of the inflatable enclosure 20 to form loops for carrying the patient support device 10. The patient support device 10 can also include one or more extended straps 38 comprising a first end portion, a second end portion, and an intermediate portion therebetween. The intermediate portion of the extended straps 38 can be attached to a surface of the enclosure 20 while the end portions of the extended straps 38 can be free (i.e., not attached to the enclosure 20 or to the foam body 12). For example, the intermediate portion of the extended straps 38 can be connected to the enclosure 20 by an adhesive (e.g., glue) and/or are sewn to the enclosure 20. The extended straps 38 can be configured to be attached to portions of an operating table or bed, such as to rails, sides, edges, or posts of the operating table or bed, for helping to secure the patient support device 10 in a desired position on the table or bed. In some examples, the extended straps 38 can include a hook and loop fabric fastener (e.g., Velcro®) for attaching the extended straps 38 to the table or bed. Alternatively or in addition, the extended straps 38 can include ties, buckles, fasteners, or other connectors, known in the art, for attaching the extended straps 38 to portions of the operating table or bed.

The patient support device 10 can also include an inlet tube 40 (shown in FIGS. 2B and 2C) in fluid communication with the inflatable cavity for providing the pressurized gas to the inflatable cavity. For example, the inlet tube 40 can comprise a nozzle and/or check valve for introducing the pressurized gas into the cavity and/or for retaining pressurized gas within the cavity.

As previously described, the body 12 and the lower pad(s) 32, 34 are formed from a viscoelastic foam material, often referred to as "memory foam." The viscoelastic foam material can be a high-viscosity foam which limits patient movement or sliding. In some examples, the surface of the foam may have a high coefficient of static friction, stickiness, or tackiness in order to provide good engagement with the patient and with the surface of the operating table. As a result of such surface properties, the patient may, in effect, stick to the patient support device 10, thereby limiting patient movement.

In some examples, the body 12 and/or the lower pad(s) 32, 34 can be formed from multiple foam blocks or foam layers that are adhered or laminated together to form the body 12 and/or pads 32, 34. The different blocks or layers can be formed from a same type of viscoelastic foam material. In other examples, different blocks or layers can be formed from different foam (e.g., viscoelastic or non-viscoelastic foam) materials. For example, the body 12 and/or pads 32, 34 can be formed from alternating blocks or layers of viscoelastic and non-viscoelastic foam. In other examples, the body 12 and/or pads 32, 34 can be formed from alternating blocks or layers of closed cell and open cell foam materials. In other examples, the body 12 and/or pads 32, 34 can comprise blocks or layers of viscoelastic foam with different characteristics (e.g., density, absorbance, porosity, softness, stickiness, etc.) In some examples, viscoelastic foam materials, which can be included in the body 12 and pads 32, 34, can include the following components and/or exhibit some or all of the following mechanical characteristics.

In some examples, the viscoelastic foam material comprises a viscoelastic polyurethane foam material with a glass transition temperature that is substantially less than a glass transition temperature for a conventional (non-viscoelastic foam). For example, the viscoelastic polyurethane foam can have a glass transition temperature of about or exceeding 0° C. or, for example, between about −10° C. and about 10° C. or between about −5° C. and about 5° C. By contrast, glass transition temperature for a conventional (non-viscoelastic foam) is about −50° C.

In some examples, the viscoelastic foam material of the body 12 and lower pad(s) 32, 34 can have one or more of the following mechanical properties: a ball rebound (ASTM D-3574) of less than 40%, or less than about 20%, or about 0.1% to about 20%, or about 1% to about 10%; a density (ASTM D-3574) of about 1 pcf to about 10 pcf, or about 2 pcf to about 8 pcf, or about 5 pcf to about 6.5 pcf (about 15 kilograms per cubic meter to about 150 kilograms per cubic meter, or about 35 kilograms per cubic meter to about 128 kilograms per cubic meter, or about 83 kilograms per cubic meter to about 103 kilograms per cubic meter); and/or an indentation force deflection (ASTM D-3574) of about 5 lbf (2.25 kg) to about 20 lbf (9 kg), or about 7 lbf (3.1 kg) to about 15 lbf (6.8 kg). The viscoelastic foam material of the body 12 and lower pad(s) 32, 34 can also have one or more of the following mechanical properties: a compression set (22 hrs. @ 70° C.), for a 25 percent compression, of less than 0.5 percent (ASTM D-3574); an air flow in the range of 0.3 to 1.0 cubic foot per minute (ASTM D-3574); a tensile strength of about 8 pounds per square inch to about 12 pounds per square inch; and/or a coefficient of static friction of about 0.2 to about 2.5. Examples of viscoelastic foam materials, which can be used with the patient support device 10 of the present disclosure, are described, for example, in: U.S. Pat. Nos. 8,464,720; 9,161,876; 9,782,287; and 11,266,525, which are incorporated herein by reference in their entireties.

In some examples, the viscoelastic foam can be configured to prevent the patient from sliding off of the foam body 12, even when the operating table and patient support device 10 are at an angle. In a similar manner, the viscoelastic foam of the lower pads 32, 34 can also be selected so that the lower pads 32, 34 frictionally engage and/or remain in place against the operating table, such that the patient support device 10 does not slide relative to the operating table, even when the operating table is moved by a substantial amount (e.g., moved to an angle of about 45 degrees).

In some examples, the viscoelastic foam material of the body 12 and/or the lower pad(s) 32, 34 can be a polyurethane foam (e.g., a foam made by mixing polyhydroxy polyol with toluene di-isocyanate, polyester polyols, and/or polyether polyols). As previously described, the selected viscoelastic foam material can have a coefficient of friction of from about 0.2 to about 2.5 to ensure sufficient frictional engagement to the patient and/or surface of the operating table. In some examples, the body 12 and the lower pad(s) 32, 34 can be formed from the same viscoelastic foam material (e.g., from a viscoelastic foam material having the same glass transition temperature, density, porosity, coefficient of friction, chemical composition, or other features). In other examples, the lower pad(s) 32, 34 and body 12 can be formed from different viscoelastic foam materials, such as materials having a different glass transition temperature, porosity, absorbance, or density. For example, the viscoelastic foam material of the body 12 can be more absorbent (e.g., moisture wicking) than the viscoelastic foam material of the lower pads 32, 34 in order to quickly and easily absorb any liquids, which collect on an outer surface of the foam body 12 and/or on other portions of the patient support device 10. The material of the body 12 can also be less dense than the material of the lower pad(s) 32, 34 to provide good patient comfort. In particular, the body 12 can be formed from a less dense (e.g., soft or plush) material that deforms under a weight of the patient creating a depression for receiving a portion of the patient's torso. By contrast, the lower pad(s) 32, 34 can be formed from a more dense material, which substantially maintains its shape when the patient's weight is exerted against the patient support device 10. As such, the lower pad(s) 32, 34 may not deform in order to maintain good contact with the surface of the operating table to hold the patient support device 10 in place against the table. In some examples, the foam body 12 can be formed from an open-cell viscoelastic foam, which is absorbent and easily deformable. By contrast, the lower pad(s) 32, 34 can be formed from a closed cell foam that is non-absorbent and/or which does not substantially deform under weight of the patient.

Figure 2C:
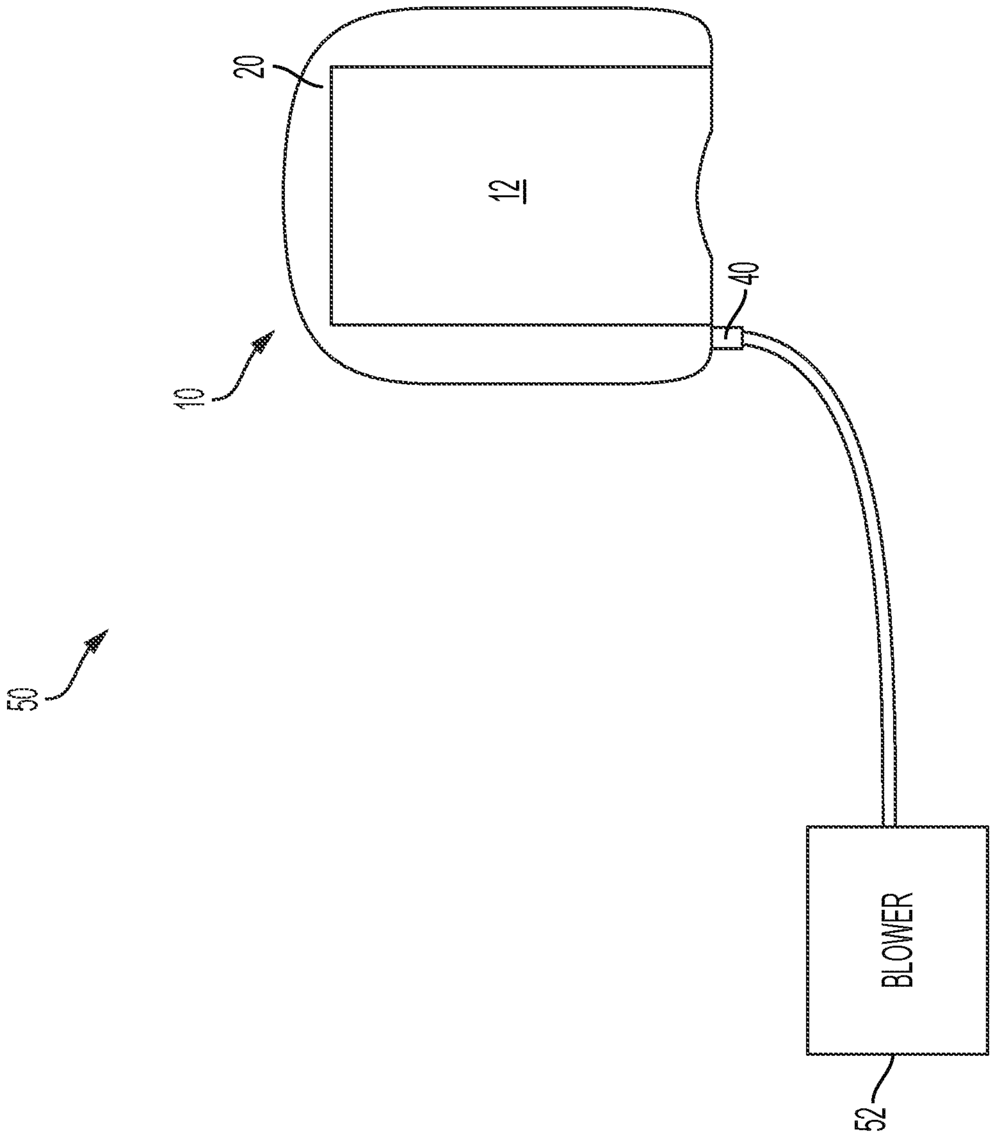
FIG. 2C is a system for inflating the patient support of FIG. 2A, according to an aspect of the disclosure.

FIG. 2C is a schematic drawing of a system 50 for patient support and lateral transport including the patient support device 10 for positioning a patient on an operating table. As previously described, the patient support device 10 includes the inflatable enclosure 20. The patient support device 10 can also include the tube 40 fluidly connected to an interior cavity of the inflatable enclosure 20 for inflating the enclosure 20.

The system 50 further comprises the blower 52, which can be connected to the tube 40 for inflating the cavity of the inflatable enclosure 20. As previously described, the blower 52 can be, for example, a Shop-Vac® vacuum, other vacuum pump, or positive pressure displacement device. The blower 52 can be configured to provide pressurized gas to the cavity of the inflatable enclosure 20 through the tube 40. The blower 52 can be manually operated by a caregiver or practitioner. For example, the caregiver or practitioner can activate the blower 52 when ready to transport a patient. Activating the blower 52 inflates the enclosure 20 causing the lower or base pads 32, 34 (shown in FIG. 1D) to lift away from the surface (e.g., the operating table). Furthermore, air through perforations 22 (shown in FIGS. 1D and 2B) blows against the table creating an air hockey effect, which further reduces any friction engagement between the patient support device 10 and the operating table.

Figure 3:
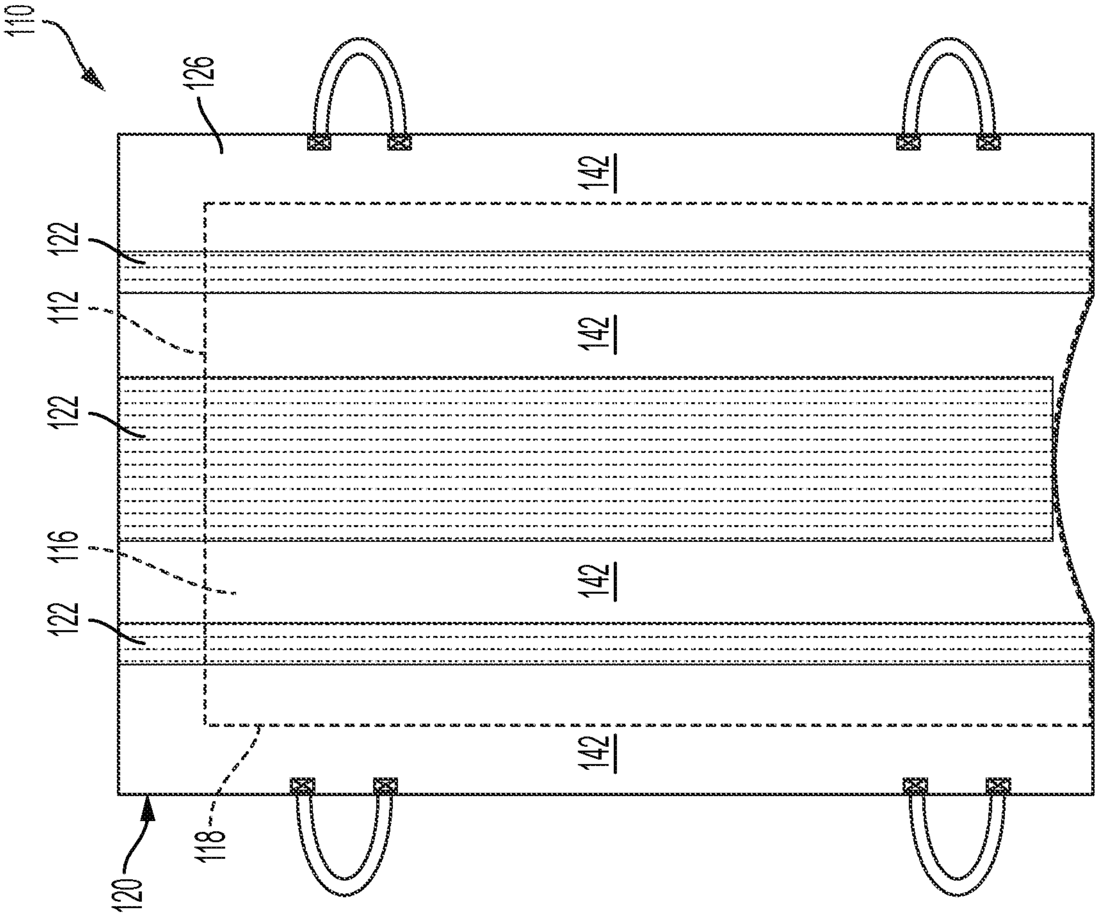
FIG. 3 is a bottom view of another example of a patient support device, according to an aspect of the present disclosure.

FIG. 3 shows another example of a patient support device 110 for positioning a patient on an operating table during a surgical procedure and for lateral patient transfer. As in previous examples, the patient support device 110 includes a viscoelastic foam body 112, which is similar or identical to the foam body 12 of previous examples. As in previous examples, the foam body 112 includes a substantially flat first or upper surface configured to be in contact with the patient, an opposing substantially flat second or lower surface 116, and a peripheral edge 118 extending therebetween. The patient support device 110 also includes an inflatable enclosure 120, which can be similar or identical to the inflatable enclosure 20, as previously described. As in previous examples, the inflatable enclosure 120 is connected to the second or lower surface 116 of the foam body 112. The inflatable enclosure 120 defines an inflatable cavity configured to receive a pressurized gas. The enclosure 120 includes a plurality of perforations 122 extending through a portion of the enclosure positioned to allow the pressurized gas to pass from the cavity through the perforations 122 toward the operating table.

Unlike in previous examples, the patient support device 110 does not include a lower cushion, pad, pillow, foam body, or support attached to a bottom surface or bottom sheet 126 of the inflatable enclosure 120. Instead, as shown in FIG. 3, the lower or bottom sheet 126 of the inflatable enclosure 120 includes an outwardly facing surface 142 configured to directly contact a surface (e.g., the operating table). As previously described, when pressurized air passes through the perforations 122 of the inflatable enclosure 120, the outwardly facing surface 142 of the enclosure 120 can be lifted slightly from the operating table to assist in moving the patient from the operating table.

FIGS. 4A-4D show another example of a patient support device 210 including many features of the previously described patient support devices 10, 110. In particular, as in previous examples, the patient support device 210 includes a viscoelastic foam body 212, which is similar or identical to the foam body 12, 112 of previous examples. As in previous examples, the foam body 212 includes a substantially flat first or upper surface 214 configured to be in contact with the patient, an opposing substantially flat second or lower surface 216, and a peripheral edge 218 extending therebetween. The patient support device 210 also includes an inflatable enclosure 220, which can be similar or identical to the inflatable enclosures 20, 120, as previously described. As in previous examples, the inflatable enclosure 220 is connected to the second or lower surface 216 of the foam body 212. The inflatable enclosure 220 defines an inflatable cavity configured to receive a pressurized gas. The enclosure 220 includes a plurality of perforations 222 (shown, for example, in FIG. 4B) extending through a portion of the enclosure 220 positioned to allow the pressurized gas to pass from the cavity through the perforations toward the operating table. The patient support device 210 also includes a lower pad 232, similar to the lower pads 32, 34 of previous examples, connected to a bottom surface 242 of the enclosure 220.

Figure 4A:
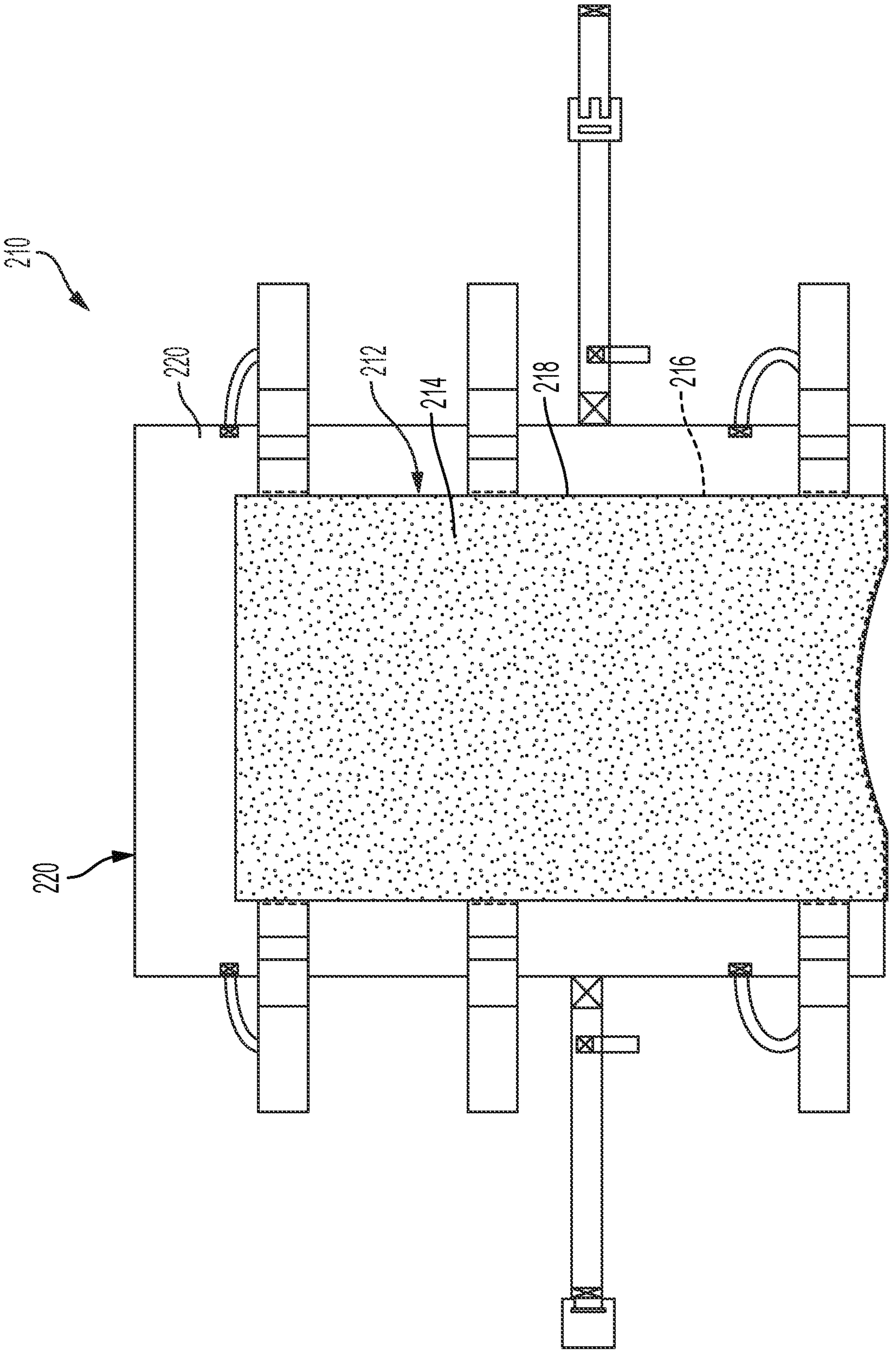
FIG. 4A is a schematic drawing of a top view of another example of a patient support device, according to an aspect of the present disclosure.
Figure 4B:
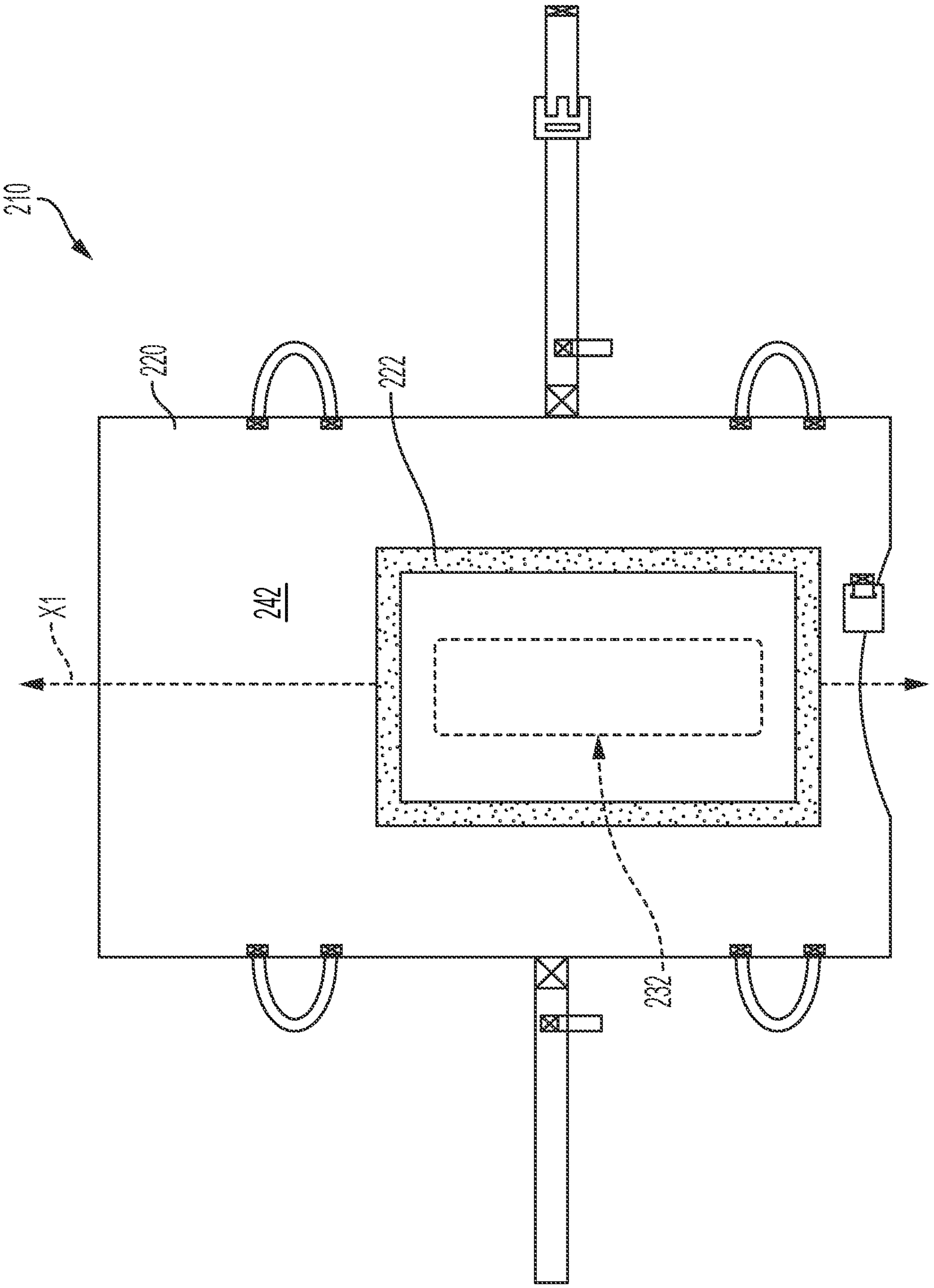
FIG. 4B is a schematic drawings of a bottom view of the patient support device of FIG. 4A.
Figure 4D:
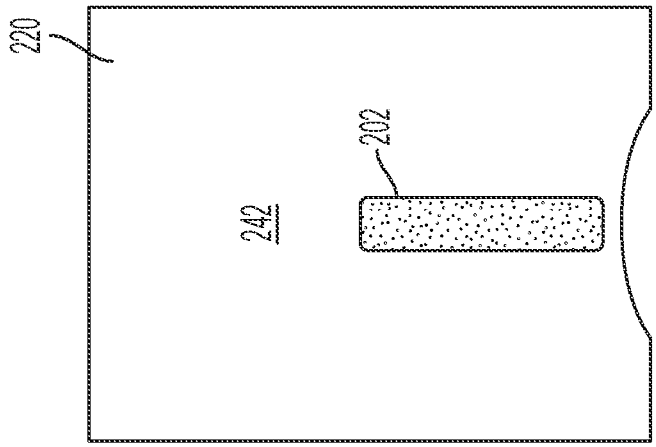
FIG. 4D is a schematic drawing of a bottom view of the patient support device of FIG. 4A with the bottom pad removed and showing an area on the bottom of the device where adhesive is applied.
Figure 4C:
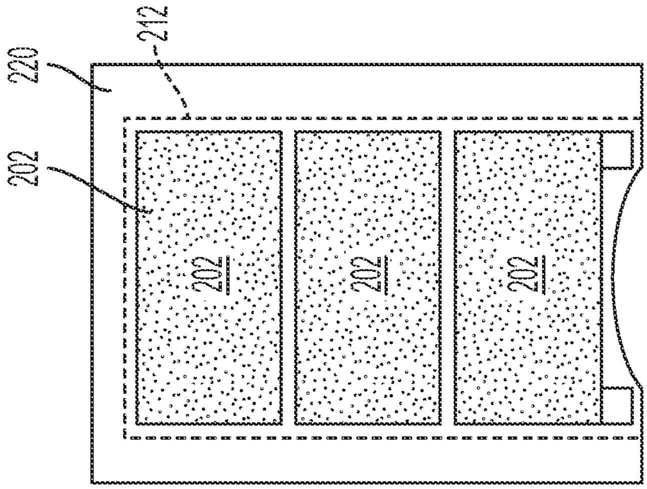
FIG. 4C is a schematic drawing of a top view of the patient support device of FIG. 4A with the top pad removed and showing areas of the device where adhesive is applied.

The patient support device 210 differs from previous examples in positioning of the lower pad 232 and perforations 222 on the bottom surface 242 of the inflatable enclosure 220. Specifically, as shown, for example, in FIG. 4B, the lower pad 232 is a generally rectangular foam pad, which can include curved corners. The lower pad 232 is positioned on a central longitudinal axis X1 of the enclosure 220, such that a central longitudinal axis of the lower pad 232 is co-extensive with the axis X1 of the enclosure 220. As shown in FIG. 4B, the area or region of the bottom surface 242 of the enclosure 220 including the perforations 222 forms a rectangle or box enclosing or surrounding the lower pad 232.

In some examples, the foam body 212 and lower pad 232 can be attached to the enclosure by applying an adhesive to portions of the top and bottom surface 242 of the enclosure 220. Areas 202 (shown in FIGS. 4C and 4D) where adhesive can be applied to the enclosure 220 to attach the body 212 and lower pad 232 to the enclosure 220 are shown by gray shapes in FIGS. 4C and 4D.

Figure 6A:
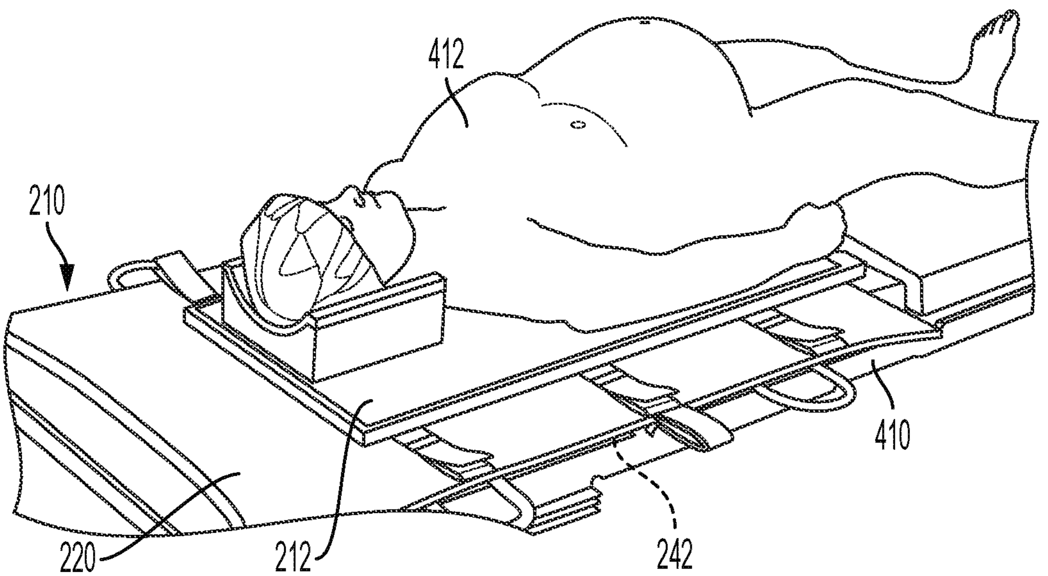
FIG. 6A is a perspective view of the patient support device of FIG. 4A in an inflated state, according to an aspect of the present disclosure.
Figure 6B:
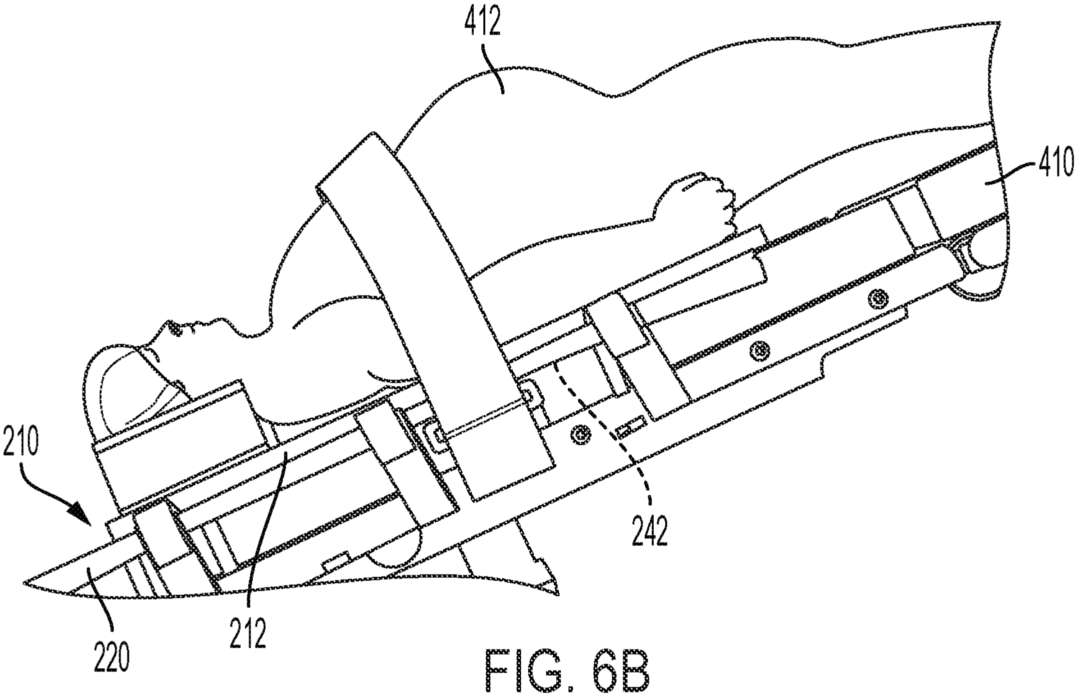
FIG. 6B is another perspective view of the patient support device of FIG. 4A showing the support device in a deflated state and with a patient lying on the patient support device.
Figure 6C:
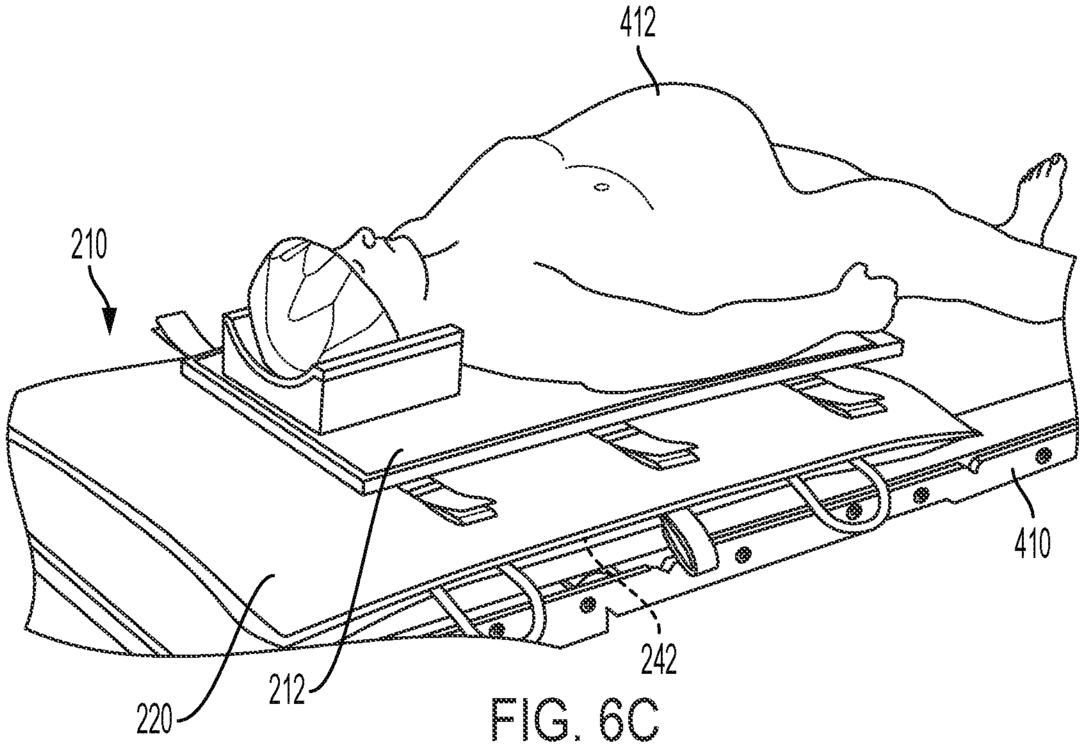
FIG. 6C is a side view of the patient support device and patient of FIG. 6B showing the patient in the Trendelenburg position.
Figure 6D:
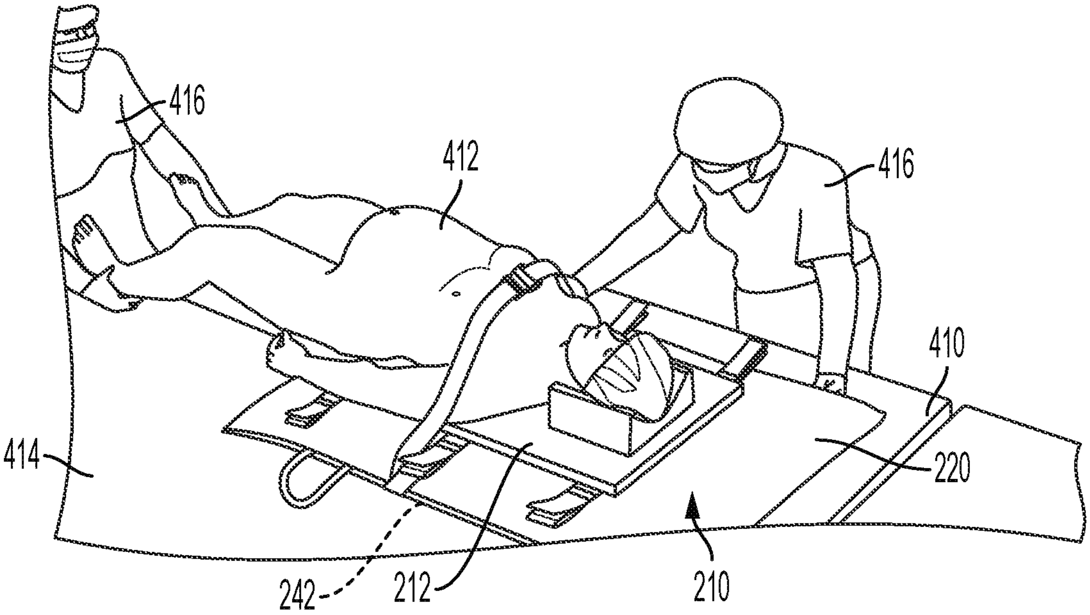
FIG. 6D is a perspective view of the patient and patient support device of FIG. 6B, with the patient support device in an inflated state and showing caregivers transitioning the patient from one surface to another surface.
Figure 7A:
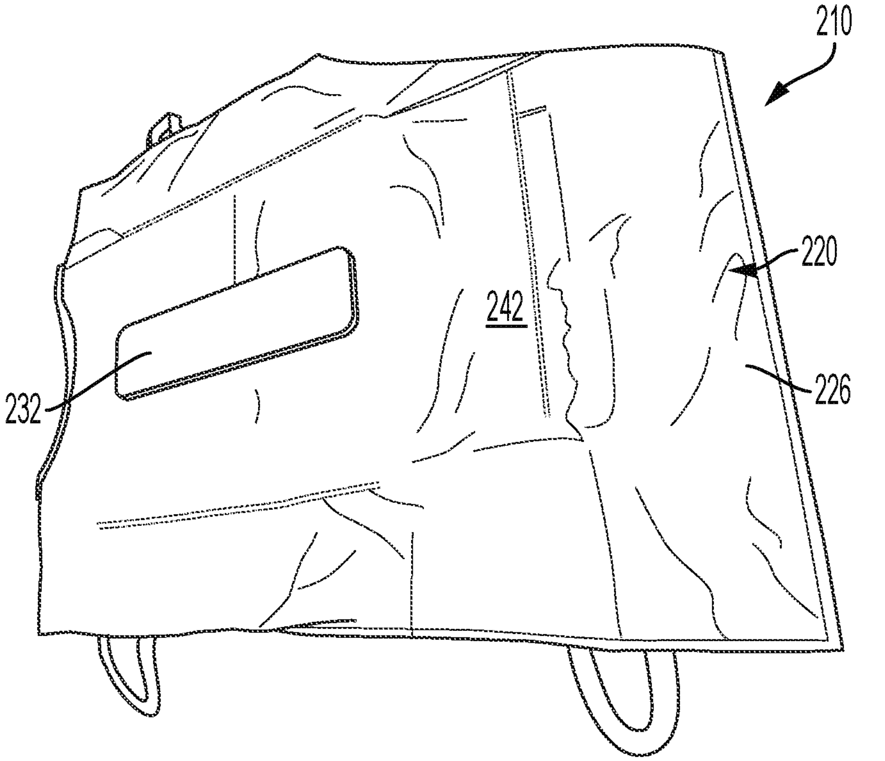
FIG. 7A is a perspective view of the bottom of the patient support device of FIG. 4A in a deflated state.
Figure 7B:
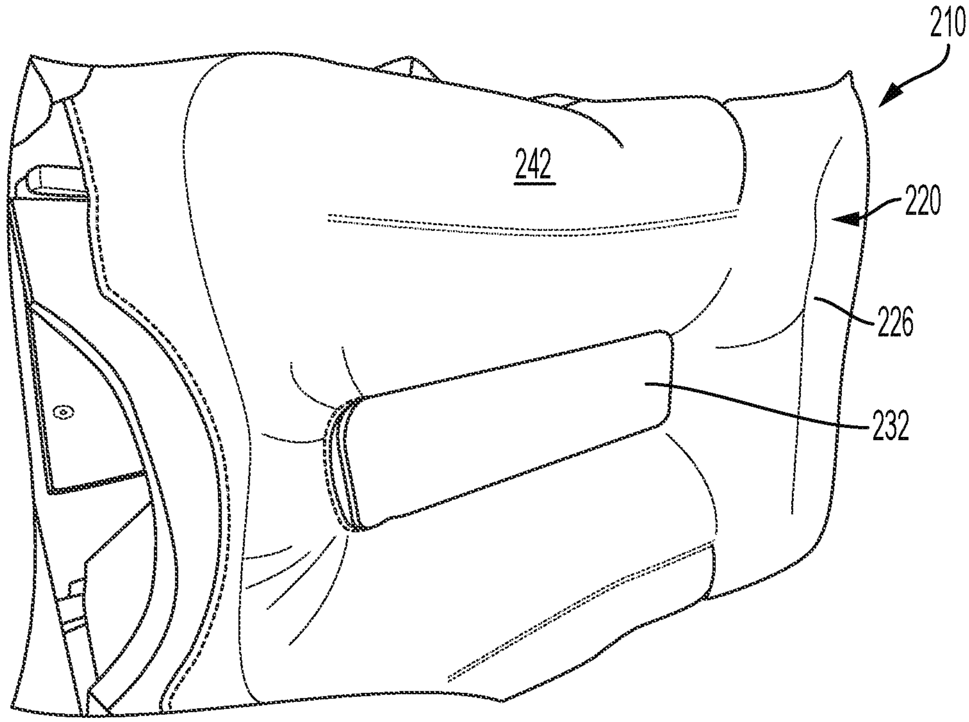
FIG. 7B is a perspective view of the bottom view of the patient support device of FIG. 4A in an inflated state.

As previously described, the enclosures 20, 120, 220 of the patient support devices 10, 110, 210 are configured to be inflated when transporting a patient. The patient support device 210 is shown in a deflated state in FIGS. 6A and 7A. FIGS. 6C, 6D, and 7B are perspective views of top portions of the patient support device 210 with the enclosure 220 in an inflated state for lifting the patient off of the surface (e.g., the operating table). Notably, as shown in FIG. 7A, in the deflated state, the lower pad 232 of the patient support device 210 is positioned over and/or extends from the bottom surface 242 of the enclosure 220. As shown in FIG. 7B, when the enclosure 220 is in the inflated state, portions of the enclosure 220 inflate around the lower pad 232, such that the lower pad 232 is recessed relative to other portions of the outer surface 242 of the enclosure 220. Due to positioning of the lower pad 232, inflating the enclosure 220 causes the lower pad 232 to lift from and/or break contact with the table surface. Once the lower pad 232 is lifted from the table surface, the patient support device 210 and patient can slide over the table surface for transferring the patient from one surface to another surface.

Extended Length Patient Support Devices

Figure 5A:
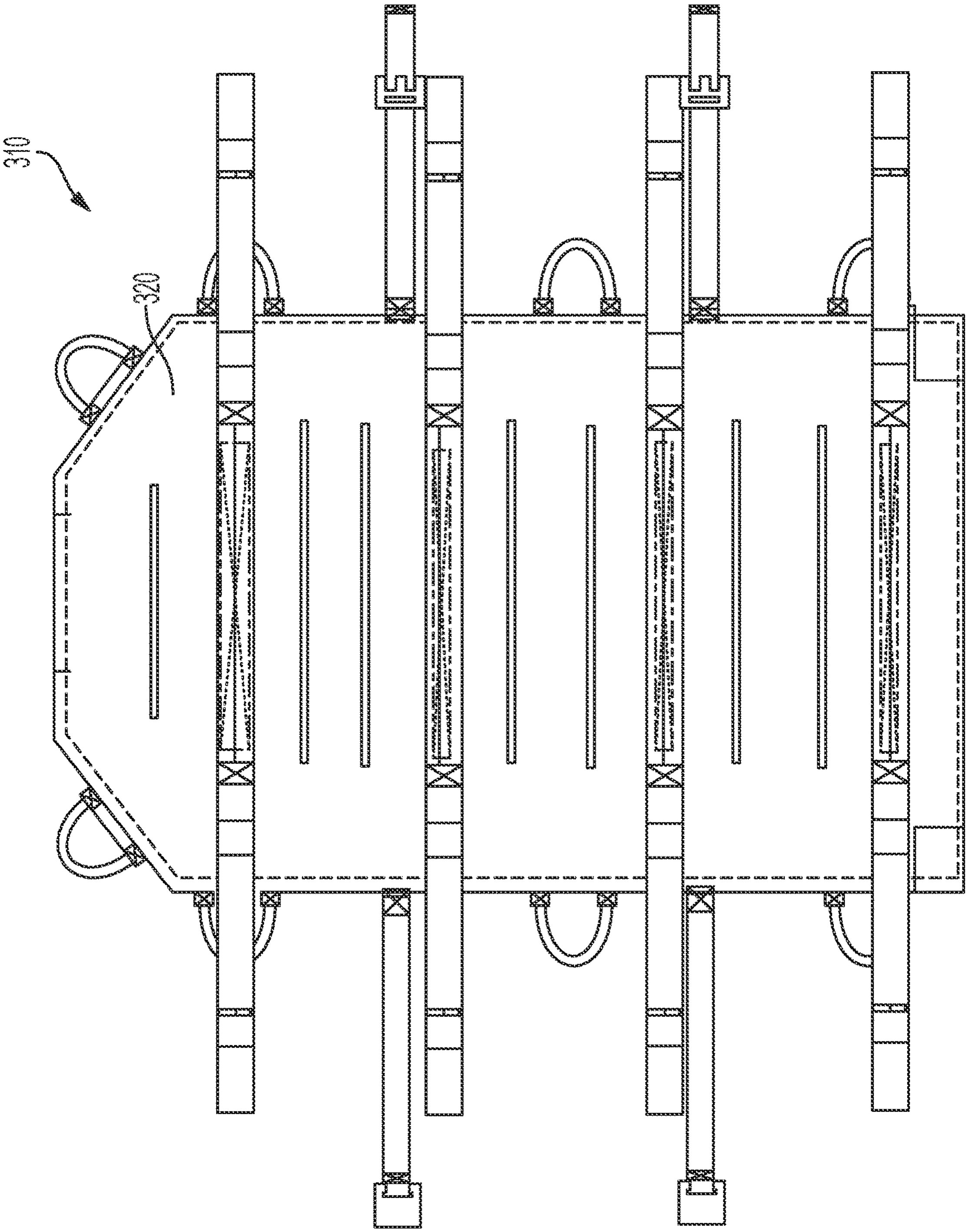
FIG. 5A is a schematic drawing of a top view of another example of a patient support device with the top pad removed, according to an aspect of the present disclosure.
Figure 5B:
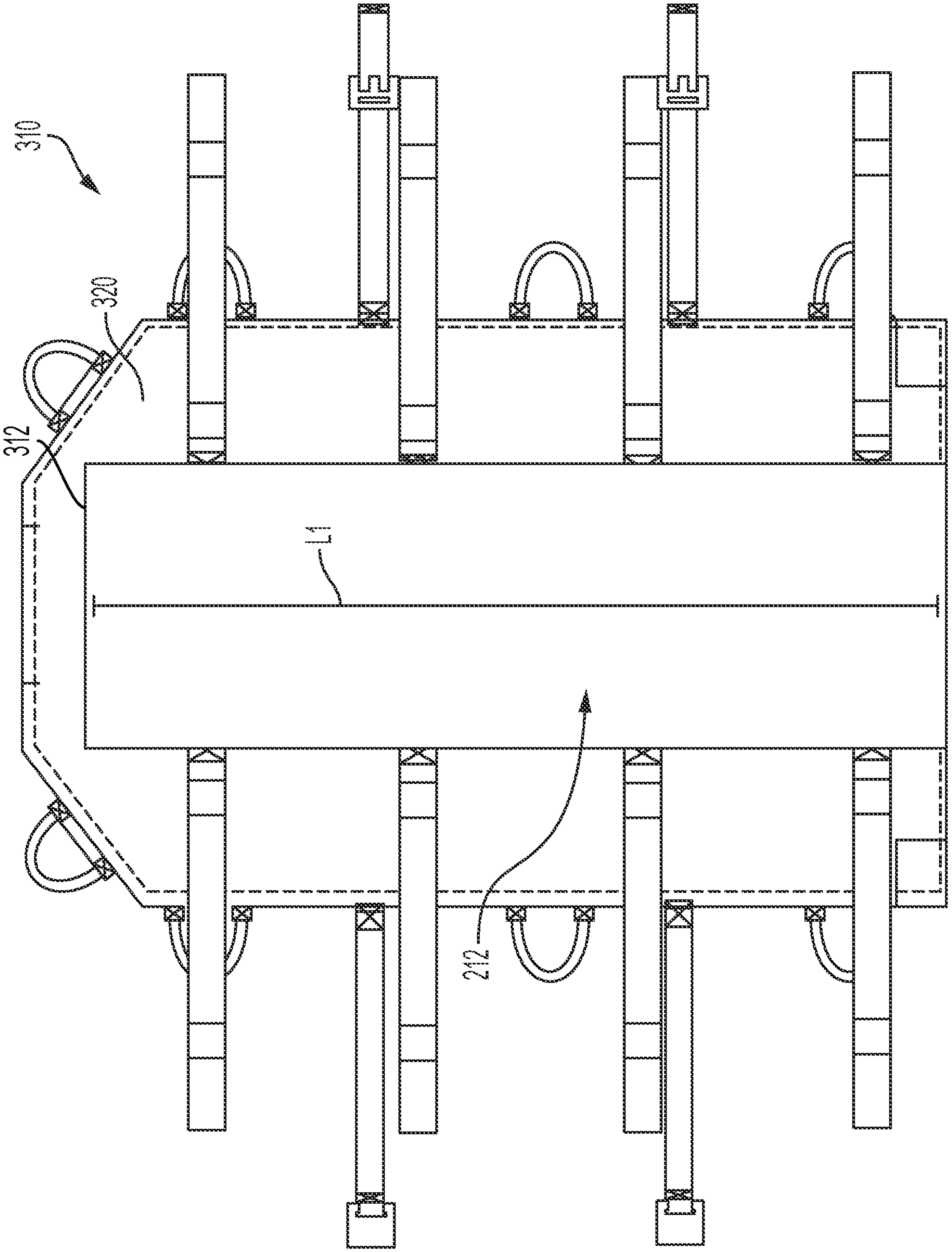
FIG. 5B is another schematic drawing of a top view of the patient support device of FIG. 5A with the top pad attached to a top surface of the device.

FIGS. 5A and 5B show another example of a patient support device 310, which is an extended length device configured to support a patient's entire body. As in previous example, the device 310 of FIGS. 5A and 5B includes a foam body 312 (shown in FIG. 5B) or top for contacting the patient, the inflatable enclosure 320, and, optionally, one or more lower pads (not shown in FIGS. 5A and 5B) for contacting the operating table. The extended patient support device 310 can be, for example, 76 inches in length L1 (shown in FIG. 5B) for use with patients of up to 76 inches tall. As shown in FIGS. 5A and 5B, the enclosure 320 can include angled or cut-out portions near the front end (i.e., near where the patient's head is positioned), which reduces a total surface area of the enclosure 320. Reducing the surface area of the enclosure 320 can reduce the total weight of the patient support device 310 and/or may reduce manufacturing costs because less material is required to make the enclosure 320.

Figure 5D:
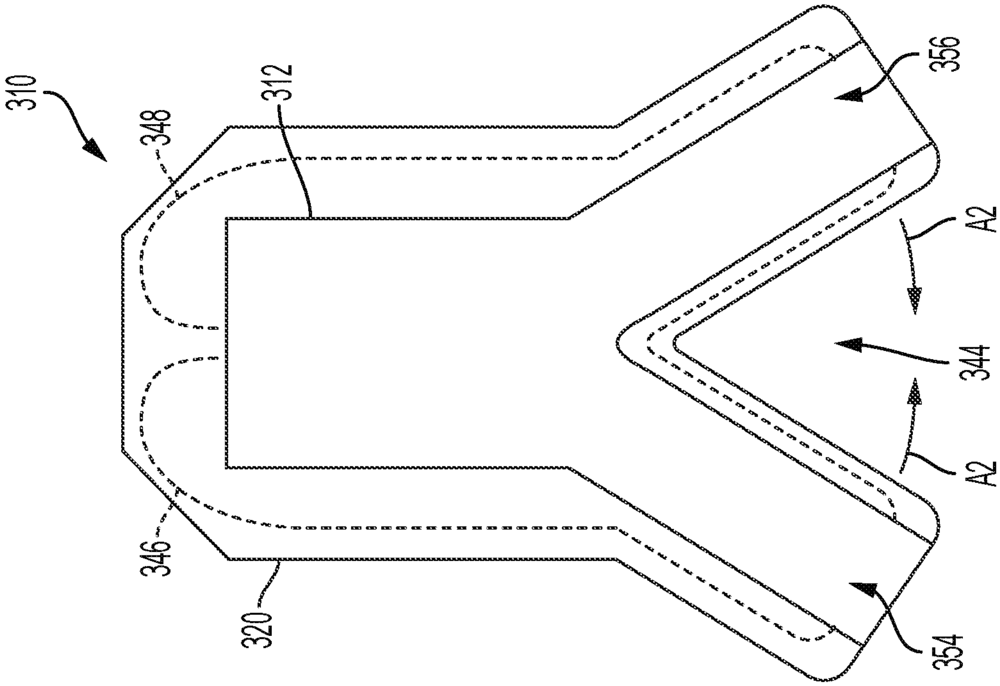
FIG. 5D is another schematic drawing of the patient support device of FIG. 5C.
Figure 5C:
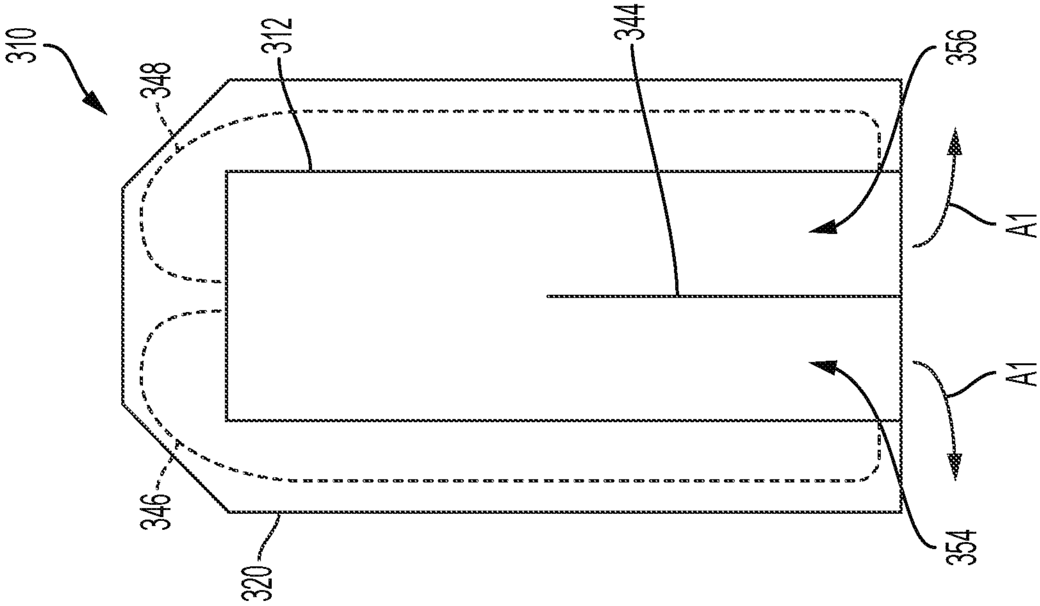
FIG. 5C is a schematic drawing of another example of a patient support device including an elongated axial slit, according to an aspect of the disclosure.

FIGS. 5C and 5D are schematic drawings showing another example of an extended length patient support device 310. As in previous example, the patient support device 310 of FIGS. 5C and 5D includes the foam body 312 or top for contacting the patient, the inflatable enclosure 320, and, optionally, one or more lower pads (not shown in FIGS. 5C and 5D) for contacting a surface, such as the operating table. As in previous examples, the extended-length patient support device 310 is configured to support a patient's entire body and can be, for example, about 60 inches to 80 inches in length or about 76 inches in length, in which case, the patient support device 310 can be configured for use with patients of up to about 76 inches tall.

Unlike in previous examples, the foam body 312 of FIGS. 5C and 5D includes an axially extending slit 344, which extends from an edge of the foam body 312 towards about a center of the foam body 312. For example, the slit 344 can be about 20 inches to about 60 inches in length, or about 30 inches to 40 inches in length, or about 38 inches in length. The slit 344 forms or defines a right leg portion 354 of the foam body 312 for supporting the patient's right leg and a left leg portion 356 of the foam body 312 for supporting the patient's left leg. Also, unlike in previous examples, the inflatable enclosure 320 can include multiple separate inflatable cavities or inflatable chambers. For example, the inflatable enclosure 320 can include a first or right side chamber 346 for supporting the patient's right side and a second or left side chamber 348 for supporting the patient's left side.

In use, the patient support device 310 can initially be positioned on a surface, such as an operating table, in a deflated state and with the right leg portion 354 proximate to the left leg portion 356, as shown in FIG. 5C. The patient can be positioned on the patient support device 310, with his or her right leg secured to the right leg portion 354 and his or her left leg secured to the left leg portion 356. In order to prepare for a surgical procedure, a practitioner can move the patient's legs either horizontally as shown by arrow A1 in FIG. 5C (i.e., spreading the patient's legs to permit access to hips and perineal region) or vertically. Moving the patient's legs causes the right leg portion 354 and first chamber 346 to move away from the left leg portion 356 and second chamber 348 providing better access for surgical procedures. In particular, including the slits 344 in the patent support device 310 allows for the patient's legs to be moved apart during the surgical procedure, substantially enhancing a range of motion for joint manipulation, which can permit a more complete dynamic exam, without needing to change surgical techniques or reposition the patient.

When ready to transport a patient from the operating table to another surface, the chambers 346, 347 of the inflatable enclosure 320 can be inflated causing the right leg portion 354 to move towards the left leg portion 356, as shown by arrow A2 (in FIG. 5D). Once the inflatable enclosure 320 is fully or partially inflated and the patient returned to the initial position (with the right leg proximate to the left leg), the practitioner can slide the patient and patient support device 310 from the operating table to another surface as described more fully in connection with the following methods.

Methods for Patient Positioning and Transfer

The patient support devices 10, 110, 210, 310 disclosed herein are used for supporting the patient during the surgical procedure and for lateral patient transfer following the surgical procedure. The following methods are described for the patient support device 210 show in FIGS. 4A-4C. It is understood, however, that similar techniques can also be used with any of the other examples of patient support devices 10, 110, 310 described in the present disclosure.

In use, during a surgical procedure, the patient support device 210 is placed on an operating table 410 in a deflated state (shown in FIGS. 6A and 7A) and with the operating table 410 in a horizontal position, such that the outer surface 242 of the enclosure 220 and lower or base pad(s) 232 contact the surface of the table 410. A patient 412 and, in some cases, a cover or lift sheet (not shown in FIG. 6A), are lowered onto the patient support device 210, such that the deflated patient support device 210 is situated between the patient 412 and the operating table 410, as shown in FIG. 6A. The foam body 212 of the patient support device 210 may or may not contact the skin of the patient 412. In some examples, the foam body 212 of the support device 210 can be configured to at least partially conform to the patient's body shape and, in particular, to form depressions under the patient's body weight for maintaining the patient's body position on the foam body 212 of the patient support device 210. In addition, the foam body 212 can be configured to provide comfort and to prevent injuries, such as pressure sores, tissue damage, skin breakdown, and muscle damage, which may occur when the patient's skin contacts hard, rigid surfaces for extended periods of time. Once the patient support device 210 and patient 412 are positioned on the operating table 410, the table 410 can be moved to an angled position placing the patient 412 in the Trendelenburg position, as shown in FIG. 6B.

Following completion of a surgical procedure and after returning the operating table 410 to the horizontal position, the patient support device 210 can be used to assist in moving the patient 412 laterally from the operating table 410 to another surface, such as a surface of a bed, gurney, stretcher, or anther transport device 414. In order to assist in patient transport, a practitioner 416 can attach a blower 52, such as a vacuum pump or positive pressure displacement device, to an end of the inlet tube 40 (shown in FIGS. 2B and 2C) of the patient support device 210. The practitioner 416 can actuate the blower 52, which provides pressurized gas through the inlet tube 40 into the cavity of the inflatable enclosure 220. The pressurized gas passes through the perforations 222 (shown in FIG. 4B) of the inflatable enclosure 220 blowing against the surface of the operating table 410. The blowing force of the pressurized gas breaks the engagement between the lower or base pad 232 and the surface of the table 410, which lifts the lower pad 232 away from the table surface, thereby reducing frictional forces between the patient support device 210 and the table 410. The patient support device 210 is shown in an inflated state in FIGS. 6C, 6D, and 7B. Once the patient support device 210 is inflated, as shown in FIG. 6D, the practitioner 416 and/or other caregivers can slide the patient support device 210 and patient 412 off of the operating table 410 and onto the surface of the bed or transport device 414. Once the patient support device 210 and patient 412 are safely moved to the new location, the practitioner can turn off and/or disconnect the blower 52 from the inlet tube 40 allowing the enclosure 220 to deflate.

While examples of the patient support device 10, 110, 210, 310 and methods of use of the present disclosure are shown in the accompanying figures and described hereinabove in detail, other examples will be apparent to, and readily made by, those skilled in the art without departing from the scope and spirit of the invention. Accordingly, the foregoing description is intended to be illustrative rather than restrictive. The invention described hereinabove is defined by the appended claims, and all changes to the invention that fall within the meaning and the range of equivalency of the claims are to be embraced within their scope.

The invention claimed is:

1. A patient support device for positioning a patient on an operating table during a surgical procedure and for lateral patient transfer, the patient support device comprising: a viscoelastic foam body comprising a substantially flat first surface configured to be in contact with the patient, an opposing substantially flat second surface, and a peripheral edge extending therebetween; an inflatable enclosure connected to the substantially flat second surface of the viscoelastic foam body that defines an inflatable cavity configured to receive a pressurized gas, wherein the inflatable enclosure comprises a plurality of perforations extending through a portion of the inflatable enclosure positioned to allow the pressurized gas to pass from the cavity through the plurality of perforations toward the operating table; and a caudal lower pad configured to be positioned proximate to a caudle region of the patient, the caudal lower pad comprising viscoelastic foam connected to the inflatable enclosure and an outwardly facing viscoelastic foam surface configured to contact the operating table for holding the patient support device in place against the operating table when the inflatable enclosure is deflated, wherein inflating the inflatable enclosure causes the caudal lower pad to lift from and break contact with the operating table, and wherein the pressurized gas passing through the plurality of perforations reduces friction between the patient support device and a surface of the operating table, thereby allowing the patient support device to slide more easily over the surface of the operating table than when the pressurized gas is not provided to the inflatable cavity.

2. The patient support device of claim 1, further comprising at least one strap for carrying the patient support device connected to the viscoelastic foam body and/or inflatable enclosure of the patient support device.

3. The patient support device of claim 1, further comprising:

- a plurality of loop straps, each loop strap having opposing ends connected to the viscoelastic foam body and/or inflatable enclosure to form loops for carrying the patient support device; and
- at least one extended strap comprising a first end portion, a second end portion, and an intermediate portion therebetween,
- wherein the intermediate portion of the at least one extended strap is attached to the inflatable enclosure while the end portions of the at least one extended strap are not connected to the inflatable enclosure.

4. The patient support device of claim 1, wherein the viscoelastic foam body is configured to extend from at least thighs of the patient to at least shoulders of the patient to support a torso of the patient placed on the viscoelastic foam body.

5. The patient support device of claim 1, wherein the viscoelastic foam body and the caudal lower pad comprise the viscoelastic foam comprising at least one of a polyurethane foam formed from a polyhydroxy polyol mixed with toluene di-isocyanate, polyester polyols, and/or polyether.

6. The patient support device of claim 1, wherein the viscoelastic foam has a coefficient of friction of from 0.2 to 2.5 and a glass transition temperature of between −5° C. and 5° C.

7. The patient support device of claim 1, wherein the viscoelastic foam has a density of 2 pcf to about 8 pcf (35 kilograms per cubic meter to 128 kilograms per cubic meter).

8. The patient support device of claim 1, wherein the viscoelastic foam body and the caudal lower pad comprise different formulations of viscoelastic foam materials.

9. The patient support device of claim 8, wherein the viscoelastic foam material of the viscoelastic foam body is more absorbent than the viscoelastic foam material of the caudal lower pad.

10. The patient support device of claim 1, wherein the viscoelastic foam body comprises an elongated pad having a length that is greater than its width, and wherein the viscoelastic foam body is from 0.5 inch to 3.0 inches or, preferably 1.5 inches thick.

11. The patient support device of claim 1, wherein the inflatable enclosure comprises a first sheet connected to the substantially flat second surface of the viscoelastic foam body and a second sheet connected to the first sheet defining the inflatable cavity, and wherein the plurality of perforations extend through the second sheet.

12. The patient support device of claim 1, wherein the plurality of perforations are provided as a first longitudinal strip, a second longitudinal strip separate from the first longitudinal strip that passes along a central longitudinal axis of the inflatable enclosure, and a third longitudinal strip that is separate from the first longitudinal strip and the second longitudinal strip.

13. The patient support device of claim 1, wherein the surgical procedure is a procedure performed with the patient in a Trendelenburg or reverse Trendelenburg position.

14. A patient system for patient support and lateral transport, comprising:

the patient support device of claim 1, further comprising an inlet tube in fluid communication with the cavity of the inflatable enclosure; and a blower connected to the inlet tube for providing the pressurized gas to the inflatable cavity of the inflatable enclosure through the inlet tube.

15. The patient support device of claim 1, further comprising a thoracic lower pad configured to be positioned proximate to a thoracic region of the patient, the thoracic lower pad comprising viscoelastic foam connected to the inflatable enclosure and an outwardly facing viscoelastic foam surface configured to contact the operating table, wherein inflating the inflatable enclosure causes the caudal lower pad and the thoracic lower pad to lift from and break contact with the operating table.

16. The patient support device of claim 1, wherein the portion of the inflatable enclosure comprising the plurality of perforations forms a shape surrounding the caudal lower pad allowing the pressurized gas to pass from the cavity through the plurality of perforations toward the operating table around the caudal lower pad.

17. The patient support device of claim 16, wherein the shape surrounding the caudal lower pad comprises an outline of a box or rectangle.

18. The patient support device of claim 1, wherein, when the inflatable enclosure is deflated, the caudal lower pad extends from an outer surface of the inflatable enclosure.

19. The patient support device of claim 18, wherein, when the inflatable enclosure is inflated, portions of the inflatable enclosure around the caudal lower pad inflate such that the caudal lower pad is recessed relative to other portions of the outer surface of the inflatable enclosure.

* * * * *